US009780905B2

(12) United States Patent
Yamauchi et al.

(10) Patent No.: US 9,780,905 B2
(45) Date of Patent: Oct. 3, 2017

(54) TRANSMISSION SYSTEM AND TRANSMISSION METHOD

(71) Applicant: FUJITSU LIMITED, Kawasaki-shi, Kanagawa (JP)

(72) Inventors: Tomohiro Yamauchi, Kawasaki (JP); Shoichiro Oda, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 12 days.

(21) Appl. No.: 14/805,988

(22) Filed: Jul. 22, 2015

(65) Prior Publication Data
US 2016/0087746 A1 Mar. 24, 2016

(30) Foreign Application Priority Data
Sep. 24, 2014 (JP) .................................. 2014-194266

(51) Int. Cl.
*H04J 14/02* (2006.01)
*H04B 10/2507* (2013.01)

(52) U.S. Cl.
CPC ...... *H04J 14/0221* (2013.01); *H04B 10/2507* (2013.01)

(58) Field of Classification Search
CPC .......................... H04J 14/0221; H04B 10/2507
USPC ......................................................... 398/79
See application file for complete search history.

(56) References Cited

U.S. PATENT DOCUMENTS

| 2013/0011138 A1* | 1/2013 | Kim | ..................... H04B 10/616 |
| | | | 398/79 |
| 2013/0121691 A1* | 5/2013 | Oda | .................... H04J 14/0221 |
| | | | 398/34 |
| 2013/0136449 A1 | 5/2013 | Liu et al. | |
| 2013/0251365 A1* | 9/2013 | Sone | ...................... H04B 17/00 |
| | | | 398/38 |
| 2014/0314416 A1 | 10/2014 | Vassilieva et al. | |
| 2015/0117853 A1* | 4/2015 | Zhang | ................ H04B 10/0795 |
| | | | 398/20 |
| 2015/0304035 A1* | 10/2015 | Nijhof | ................. H04J 14/0221 |
| | | | 398/26 |

FOREIGN PATENT DOCUMENTS

| EP | 2858271 A1 | 4/2015 |
| JP | 2013-106328 | 5/2013 |
| WO | 2014/000229 A1 | 1/2014 |
| WO | 2014/019631 A1 | 2/2014 |

OTHER PUBLICATIONS

Extended European Search Report mailed Jan. 27, 2016 in related European Application No. 15178461.8.

* cited by examiner

*Primary Examiner* — Juan A Torres
(74) *Attorney, Agent, or Firm* — Staas & Halsey LLP

(57) ABSTRACT

A transmission system includes: an acquisition section configured to acquire a free band between a target channel including a plurality of wavelength signals contiguous to one another and a channel adjacent to the target channel; and an adjustment section configured to adjust signal power of at least one of the plurality of wavelength signals in the target channel, based on a power adjustment amount for the wavelength signal, the power adjustment amount being provided for the free band acquired by the acquisition section.

9 Claims, 23 Drawing Sheets

FIG. 4A

4 SUB-CARRIERS                                    14A, 14

| FREE SLOT AMOUNT | SC1 | SC2 | SC3 | SC4 |
|---|---|---|---|---|
| 0 GHz | 0 dB | 0 dB | 0 dB | 0 dB |
| 12.5 | −0.3 | 0 | 0 | −0.3 |
| 25 | −0.5 | 0 | 0 | −0.5 |
| ⋮ | ⋮ | ⋮ | ⋮ | ⋮ |
| 62.5 | −0.8 | 0 | 0 | −0.8 |
| ⋮ | ⋮ | ⋮ | ⋮ | ⋮ |

FIG. 4B

5 SUB-CARRIERS                                           14B, 14

| FREE SLOT AMOUNT | SC1 | SC2 | SC3 | SC4 | SC5 |
|---|---|---|---|---|---|
| 0 GHz | 0 dB | 0 dB | 0 dB | 0 dB | 0 dB |
| 12.5 | −0.6 | −0.3 | 0 | −0.3 | −0.6 |
| 25 | −1.0 | −0.5 | 0 | −0.5 | −1.0 |
| ⋮ | ⋮ | ⋮ | ⋮ | ⋮ | ⋮ |

| SC1 | SC2 | SC3 | SC4 |
|---|---|---|---|
| −0.8 dB | 0 dB | 0 dB | −0.8 dB |

| SC1 | SC2 | SC3 | SC4 | SC5 |
|---|---|---|---|---|
| −2.0 dB | −1.5 dB | 0 dB | −0.3 dB | −0.6 dB |

ADJACENT CHANNEL: QPSK                                14C

| FREE SLOT AMOUNT | SC1 | SC2 | SC3 | SC4 | SC5 |
|---|---|---|---|---|---|
| 0 GHz | 0 dB | 0 dB | 0 dB | 0 dB | 0 dB |
| 12.5 | −0.6 | −0.3 | 0 | −0.3 | −0.6 |
| 25 | −1.0 | −0.5 | 0 | −0.5 | −1.0 |
| ⋮ | ⋮ | ⋮ | ⋮ | ⋮ | ⋮ |
| 137.5 | −2.0 | −1.5 | 0 | −1.5 | −2.0 |
| 150 | −2.0 | −1.5 | 0 | −1.5 | −2.0 |
| ⋮ | ⋮ | ⋮ | ⋮ | ⋮ | ⋮ |

FIG. 11C                                              14D

ADJACENT CHANNEL: 16QAM

| FREE SLOT AMOUNT | SC1 | SC2 | SC3 | SC4 | SC5 |
|---|---|---|---|---|---|
| 0 GHz | 0 dB | 0 dB | 0 dB | 0 dB | 0 dB |
| 12.5 | −0.4 | −0.1 | 0 | −0.1 | −0.4 |
| 25 | −1.8 | −0.3 | 0 | −0.3 | −0.8 |
| ⋮ | ⋮ | ⋮ | ⋮ | ⋮ | ⋮ |
| 137.5 | −1.8 | −1.3 | 0 | −1.3 | −1.8 |
| 150 | −1.8 | −1.3 | 0 | −1.3 | −1.8 |
| ⋮ | ⋮ | ⋮ | ⋮ | ⋮ | ⋮ |

| SC1 | SC2 | SC3 | SC4 | SC5 |
|---|---|---|---|---|
| −2.0 dB | −1.5 dB | 0 dB | −1.3 dB | −1.8 dB |

FIG. 12A
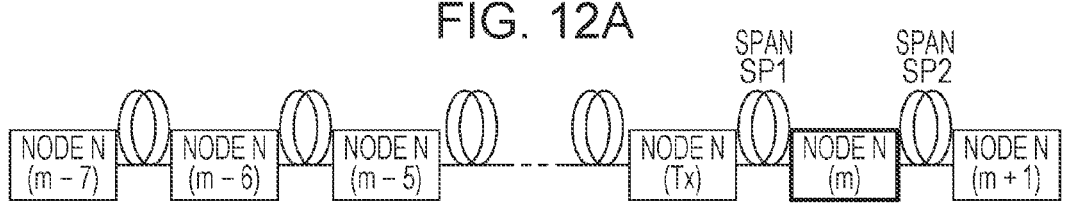
FIG. 12B
| CORRESPONDENCE TABLE OF NODE N(m) (INPUT IN 2ND SPAN) | | | | | 14E |
|---|---|---|---|---|---|
| FREE SLOT AMOUNT | SC1 | SC2 | SC3 | SC4 | |
| 0 GHz | 0 dB | 0 dB | 0 dB | 0 dB | |
| 12.5 | −0.5 | 0 | 0 | −0.5 | |
| 25 | −0.8 | 0 | 0 | −0.8 | |
| ⋮ | ⋮ | ⋮ | ⋮ | ⋮ | |
FIG. 12C
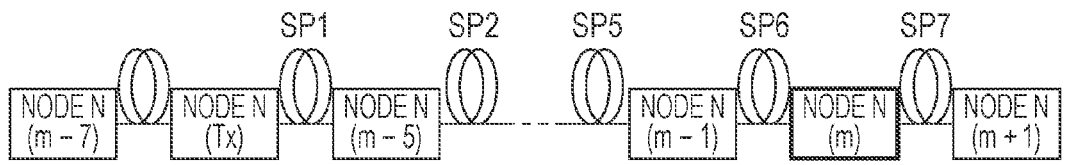
FIG. 12D
| CORRESPONDENCE TABLE OF NODE N(m) (NODE WITH INPUT IN 7TH SPAN) | | | | | 14F |
|---|---|---|---|---|---|
| FREE SLOT AMOUNT | SC1 | SC2 | SC3 | SC4 | |
| 0 GHz | 0 dB | 0 dB | 0 dB | 0 dB | |
| 12.5 | −0.3 | 0 | 0 | −0.3 | |
| 25 | −0.5 | 0 | 0 | −0.5 | |
| ⋮ | ⋮ | ⋮ | ⋮ | ⋮ | |

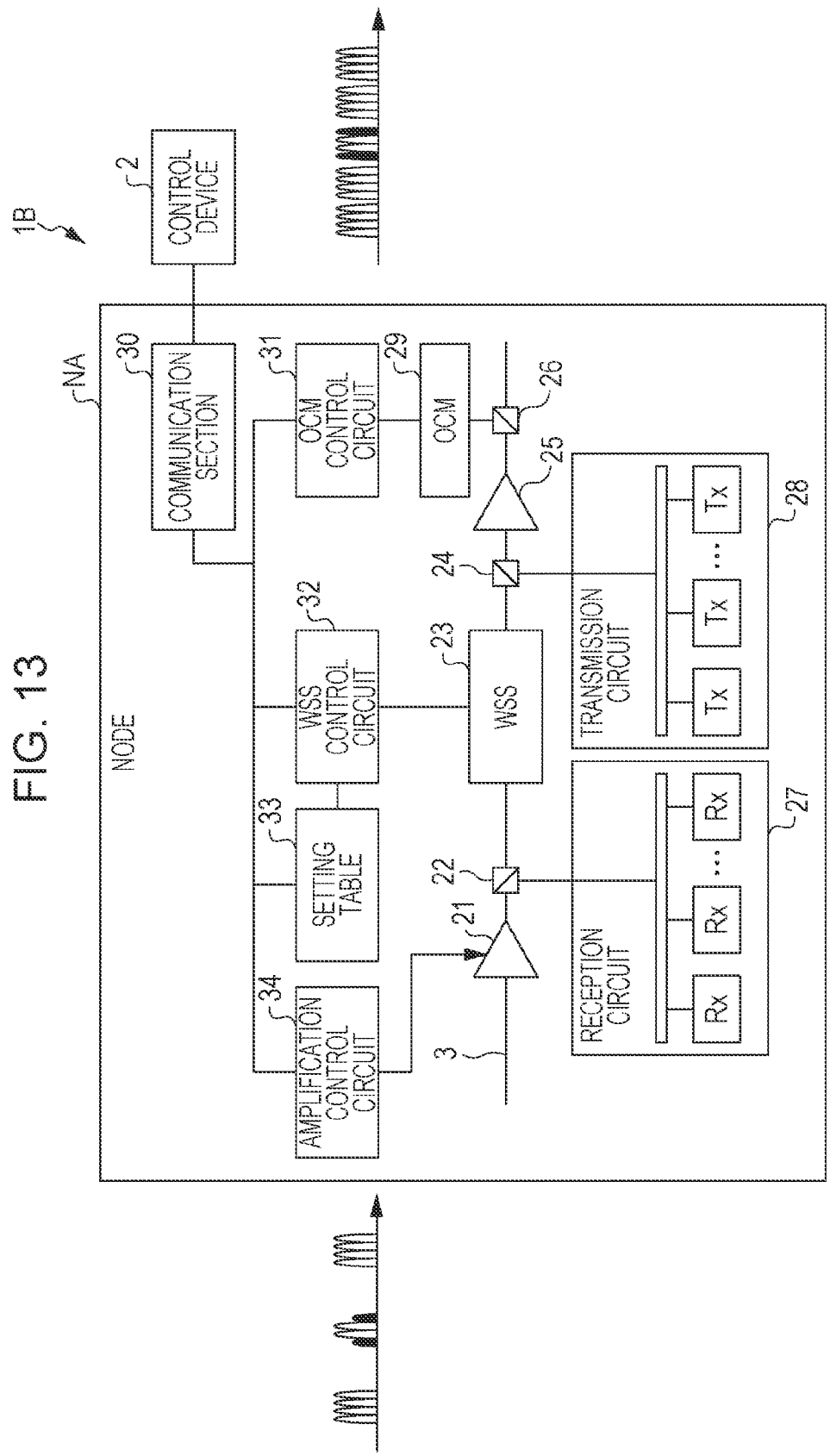

FIG. 21A 14X, 14

4 SUB-CARRIERS

| FREE SLOT AMOUNT | SC1 | SC2 | SC3 | SC4 |
|---|---|---|---|---|
| 0 GHz | 0 dB | 0 dB | 0 dB | 0 dB |
| ⋮ | ⋮ | ⋮ | ⋮ | ⋮ |
| 25 | 0 | +0.5 | +0.5 | 0 |
| ⋮ | ⋮ | ⋮ | ⋮ | ⋮ |

FIG. 21B 14Y, 14

5 SUB-CARRIERS

| FREE SLOT AMOUNT | SC1 | SC2 | SC3 | SC4 | SC5 |
|---|---|---|---|---|---|
| 0 GHz | 0 dB | 0 dB | 0 dB | 0 dB | 0 dB |
| ⋮ | ⋮ | ⋮ | ⋮ | ⋮ | ⋮ |
| 25 | 0 | +0.5 | +1.0 | +0.5 | 0 |
| ⋮ | ⋮ | ⋮ | ⋮ | ⋮ | ⋮ |

TRANSMISSION SYSTEM AND TRANSMISSION METHOD

CROSS-REFERENCE TO RELATED APPLICATION

This application is based upon and claims the benefit of priority of the prior Japanese Patent Application No. 2014-194266, filed on Sep. 24, 2014, the entire contents of which are incorporated herein by reference.

FIELD

The embodiments discussed herein are related to a transmission system and a transmission method.

BACKGROUND

For example, there is known a super-channel in which a plurality of sub-channels undergo high-density wavelength multiplexing and are thereby regarded as one signal, the wavelength multiplexing using an orthogonal frequency division multiplexing (OFDM) technique or a Nyquist-wavelength division multiplexing (WDM) technique.

Japanese Laid-Open Patent Publication No. 2013-106328 is an example of related art.

In a case where a free frequency band exists between a super-channel transmitted through an optical transmission line and another channel adjacent to the super-channel, a sub-channel (SC) on the free frequency band side of the super-channel is influenced by nonlinear noise, and thus there arise differences in transmission performance among SCs. As a result, the transmission characteristics of the entire super-channel are deteriorated. Moreover, the transmission performance differences among the SCs vary with the width of the free frequency band.

SUMMARY

According to an aspect of the invention, a transmission system includes: an acquisition section configured to acquire a free band between a target channel including a plurality of wavelength signals contiguous to one another and a channel adjacent to the target channel; and an adjustment section configured to adjust signal power of at least one of the plurality of wavelength signals in the target channel, based on a power adjustment amount for the wavelength signal, the power adjustment amount being provided for the free band acquired by the acquisition section.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B are each an explanatory diagram illustrating an example of a correspondence table;

FIGS. 11A, 11B, and 11C are each an explanatory diagram illustrating an example of adjustment amounts set in consideration of a channel group based on a different modulation system;

FIGS. 12A, 12B, 12C, and 12D are each an explanatory diagram illustrating an example of adjustment amounts set in consideration of the number of spans;

FIG. 13 is a block diagram illustrating an example of an optical transmission system in Embodiment 2;

FIGS. 21A and 21B are each an explanatory diagram illustrating an example of a correspondence table.

DESCRIPTION OF EMBODIMENTS

Hereinafter, embodiments of a transmission system and a transmission method disclosed in the present application will be described in detail with reference to the drawings. Note that the embodiments disclosed below do not limit the disclosed technology and may be combined appropriately without causing inconsistency.

Figure 22:
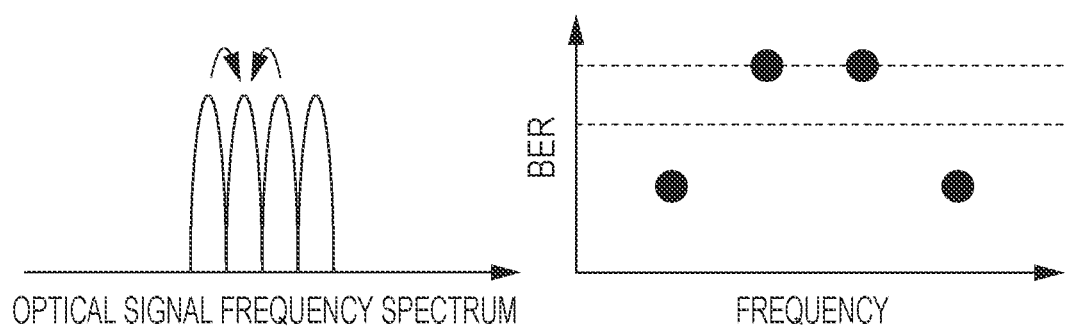
FIG. 22 is an explanatory diagram illustrating an example in which a super-channel is influenced by nonlinear noise caused by cross-phase modulation.

FIG. 22 is an explanatory diagram illustrating an example in which a super-channel is influenced by nonlinear noise caused by cross-phase modulation. In the super-channel illustrated in FIG. 22, for example, center sub-carriers (SCs) of a plurality of SCs contiguous to one another in the super-channel are influenced by the end SCs respectively contiguous to the center SCs due to nonlinear noise caused by cross-phase modulation, and thus signal power of the center SCs is lowered. As a result, the lowering of the signal power causes transmission performance differences among the SCs in the super-channel and thus transmission characteristics deterioration in the entire super-channel.

Embodiment 1

Figure 1:
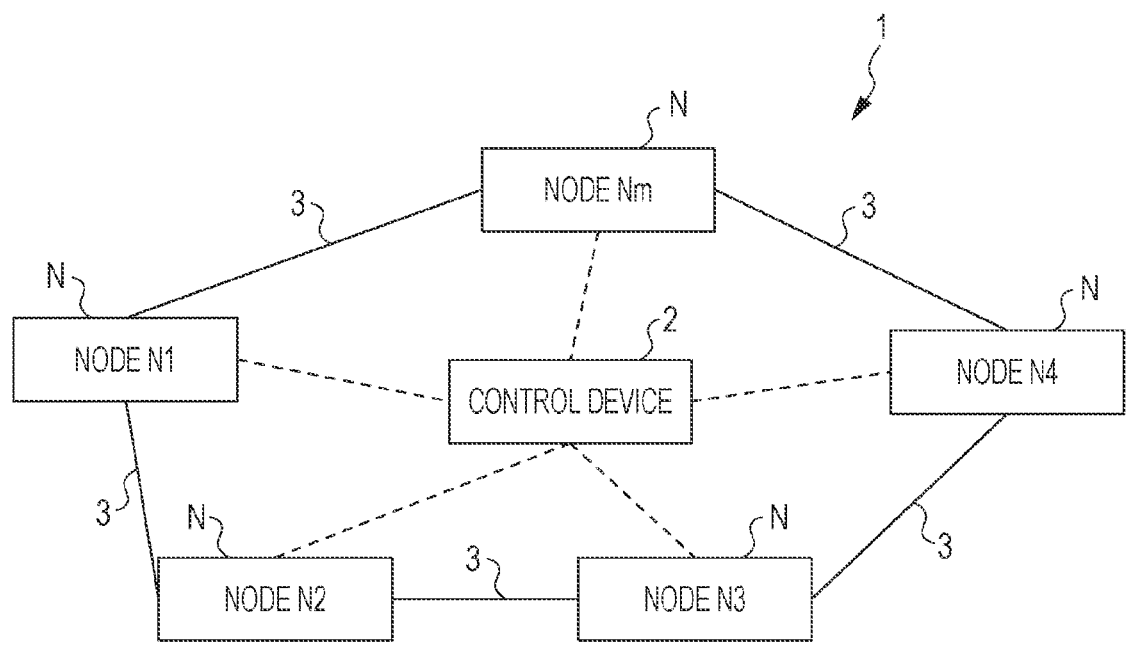
FIG. 1 is an explanatory diagram illustrating an example of an optical transmission system in Embodiment 1.

FIG. 1 is an explanatory diagram illustrating an example of an optical transmission system 1 in Embodiment 1. The optical transmission system 1 illustrated in FIG. 1 transmits a super-channel in which, for example, a plurality of SCs undergo wavelength multiplexing and are thereby regarded as one signal. The optical transmission system 1 includes a plurality of nodes N (N1 to Nm) and a control device 2 that monitors and controls the nodes N. The nodes N are connected to one another through optical transmission lines 3. Each node N is identified by appending "N" with a natural number.

Figure 2:
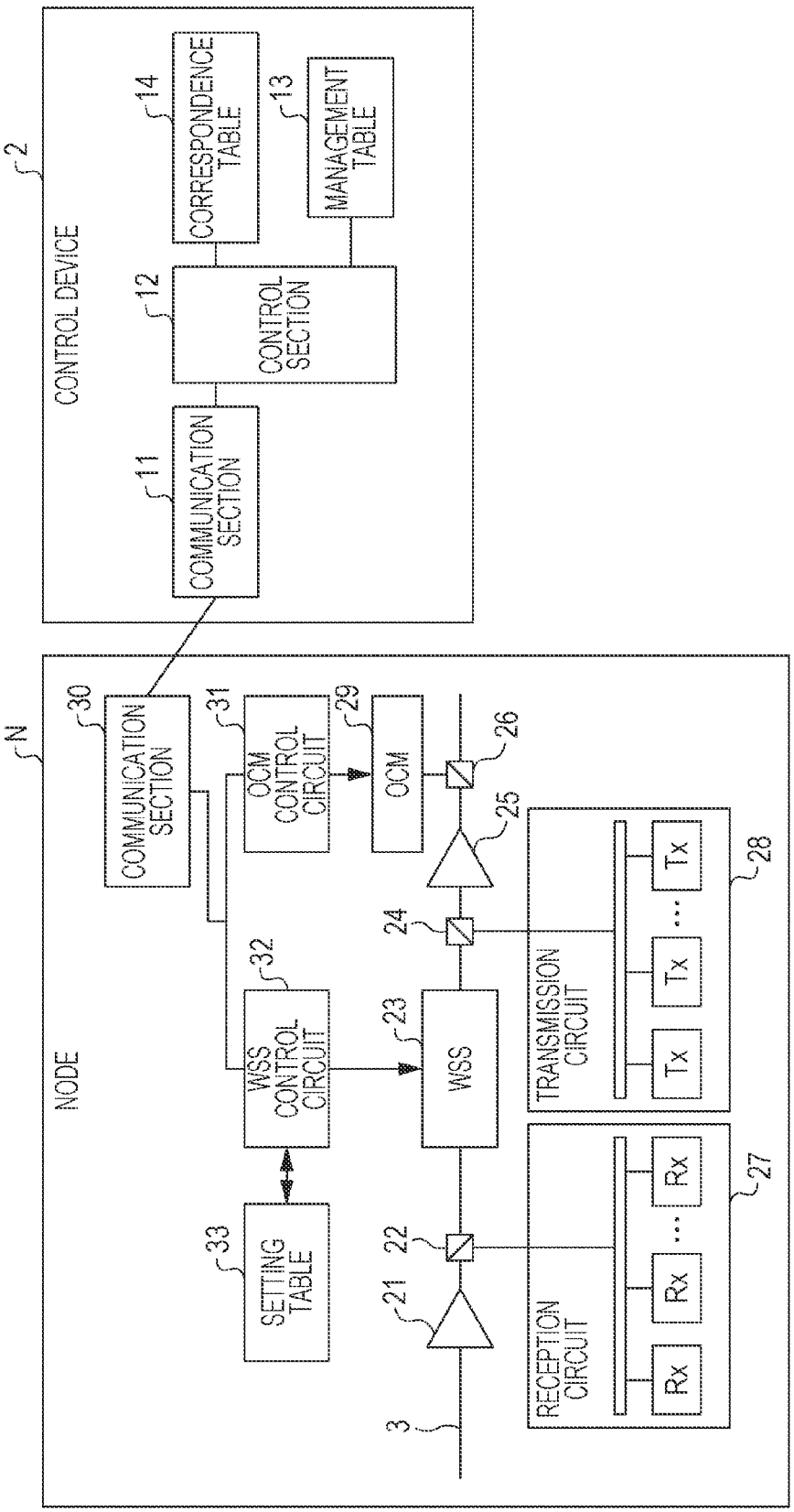
FIG. 2 is a block diagram illustrating an example of each of nodes and a control device.
Figure 3:
FIG. 3 is an explanatory diagram illustrating an example of a management table.

FIG. 2 is a block diagram illustrating an example of each of the nodes N and the control device 2. The control device 2 illustrated in FIG. 2 includes a communication section 11, a control section 12, a management table 13, and a correspondence table 14. The control section 12 is also call as an acquisition section 12. The communication section 11 is a communication interface for connecting to and communicating with each node N. The control section 12 controls the entire control device 2. The management table 13 is used to manage a frequency bandwidth (a slot amount) based on a use state, such as a used slot or a free slot, of a slot of a communication band that is used for communications via the corresponding optical transmission line 3 of the node N. Note that a free slot corresponds to a free frequency band between a control target super-channel (described later) and another channel adjacent to the super-channel. FIG. 3 is an explanatory diagram illustrating an example of the management table 13. The management table 13 illustrated in FIG. 3 is managed for each node N and is used to manage slot amounts on a per slot-use-state basis.

FIGS. 4A and 4B are each an explanatory diagram illustrating an example of the correspondence table 14. The correspondence table 14 is provided for the number of SCs in a super-channel transmitted by a node N in the optical transmission system 1. The correspondence table 14 is used to manage adjustment amounts provided for respective control target SCs (hereinafter, referred to as control-target-SC-specific adjustment amounts) on a per free-slot-amount basis. A free slot amount is a free frequency bandwidth between a control target super-channel and another channel adjacent to the control target super-channel. An adjustment amount corresponds to an optimum output level of signal power for the control target SC. A small free slot amount leads to small transmission characteristic differences among SCs in the control target super-channel and thus small adjustment amounts for the SCs. A large free slot amount leads to large transmission characteristic differences among the SCs in the control target super-channel and thus large adjustment amounts for the SCs.

Each control-target-SC-specific adjustment amount is actually measured in advance by using a measuring device (not illustrated) in accordance with the specifications of the optical transmission line 3 and the node N in the optical transmission system 1, and the control device 2 stores the control-target-SC-specific adjustment amount in the correspondence table 14. A correspondence table 14A illustrated in FIG. 4A corresponds to a table for a super-channel having four SCs, which are SC1, SC2, SC3, and SC4, and is used to manage control-target-SC-specific adjustment amounts provided for the corresponding free slot amount. For example, in a case where a free slot amount is 25 GHz, adjustment amounts for the respective center SCs that are SC2 and SC3 are 0 dB, and adjustment amounts for the respective end SCs that are SC1 and SC4 are −0.5 dB. In other words, in a case where the number of SCs is an even number of 4 or higher, an adjustment amount for each of the two center SCs is set at 0 dB, and the adjustment amount is increased in a signal-power attenuation direction as a target SC is moved closer to the end SCs from the center SCs.

A correspondence table 14B illustrated in FIG. 4B corresponds to a table for a super-channel having five SCs, which are SC1, SC2, SC3, SC4, and SC5, and is used to manage control-target-SC-specific adjustment amounts provided for the corresponding free slot amount. For example, in a case where a free slot amount is 25 GHz, an adjustment amount for the center SC3 is 0 dB, adjustment amounts for SC2 and SC4 next to SC3, respectively, are −0.5 dB, and adjustment amounts for the respective end SCs that are SC1 and SC5 next to SC2 and SC4, respectively, are −1.0 dB. In other words, in a case where the number of SCs is an odd number, an adjustment amount for the one center SC is set at 0 dB, and the adjustment amount is increased in a signal-power attenuation direction as a target SC is moved closer to the end SCs from the center SCs.

Upon detecting a free slot in the optical transmission system 1, the control section 12 selects a correspondence table 14 provided in accordance with the number of SCs in a super-channel that is contiguous to the free slot and is transmitted by the corresponding node N. The control section 12 further acquires, from the selected correspondence table 14, control-target-SC-specific adjustment amounts provided for a free slot amount. For example, suppose a case where the control target super-channel has four SCs and where a free slot amount on the short wavelength side and a free slot amount on the long wavelength side are the same amount of 62.5 GHz. In this case, the control section 12 acquires an adjustment amount of −0.8 dB for SC1 and SC4 and an adjustment amount of 0 dB for SC2 and SC3 from the correspondence table 14 illustrated in FIG. 4A. The control section 12 further notifies the control target node N of the acquired control target SCs and the control-target-SC-specific adjustment amounts.

Figure 5:
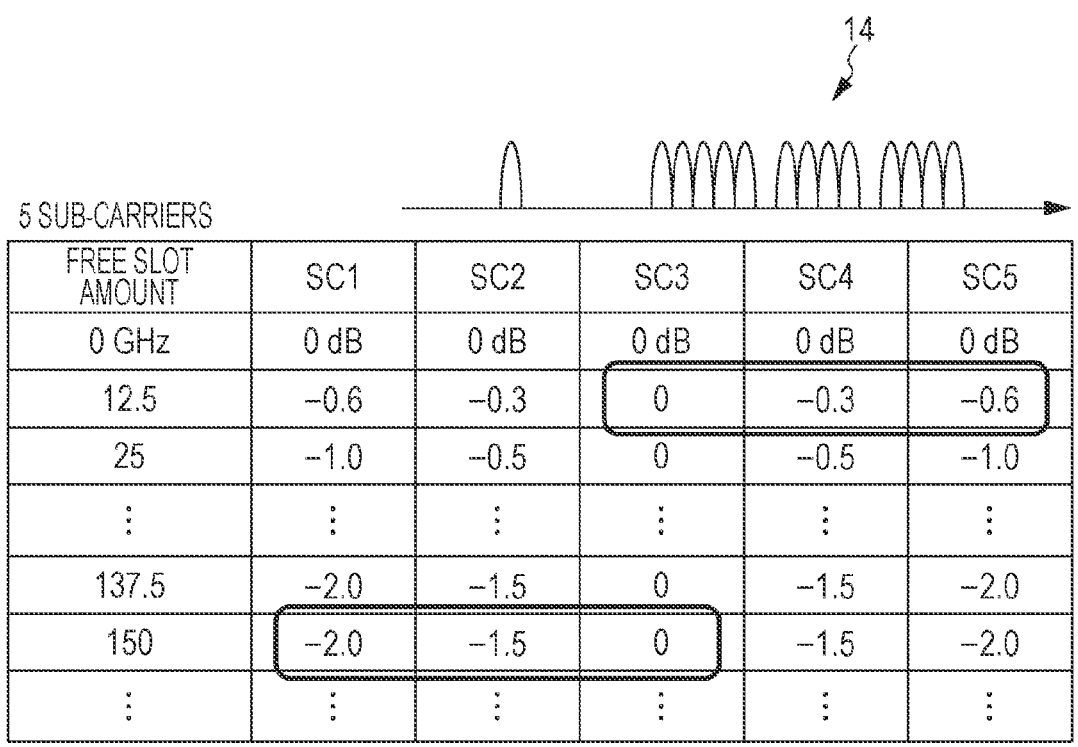
FIG. 5 is an explanatory diagram illustrating an example of how to acquire adjustment amounts in a case of different free slot amounts on the respective long and short wavelength sides.

FIG. 5 is an explanatory diagram illustrating an example of how to acquire adjustment amounts in a case of different free slot amounts on the respective long and short wavelength sides. In the example in FIG. 5, a control target super-channel has five SCs, a free slot amount on the short wavelength side is 150 GHz, and a free slot amount on the long wavelength side is 12.5 GHz. Since the number of SCs is 5, the control section 12 acquires an adjustment amount of 0 dB for SC3 in the center. In the case where the free slot amount on the short wavelength side is 150 GHz, control target SCs on the short wavelength side are SC1, SC2, and SC3, and thus the control section 12 acquires adjustment amounts for SC1 to SC3. Specifically, the control section 12 acquires adjustment amounts of −2.0 dB, −1.5 dB, and 0 dB for SC1, SC2, and SC3, respectively, from the correspondence table 14 illustrated in FIG. 5. In the case where the free slot amount on the long wavelength side is 12.5 GHz, control target SCs on the long wavelength side are SC3, SC4, and SC5, and thus the control section 12 acquires adjustment amounts for SC3 to SC5. Specifically, the control section 12 acquires adjustment amounts of 0 dB, −0.3 dB, and −0.6 dB for SC3, SC4, and SC5 from the correspondence table 14. Then, the control section 12 notifies the control target node N of the acquired control target SCs and the acquired control-target-SC-specific adjustment amounts.

The node N illustrated in FIG. 2 includes a first optical amplifier 21, an optical divider 22, a wavelength selective switch (WSS) 23, an optical inserter 24, a second optical amplifier 25, an optical divider 26, a reception circuit 27, and a transmission circuit 28. The node N further includes an optical channel monitor (OCM) 29, a communication section 30, an OCM control circuit 31, a WSS control circuit 32, and a setting table 33.

The first optical amplifier 21 is used to perform optical amplification on a super-channel received in an input stage from the optical transmission line 3. The optical divider 22 optically divides the super-channel amplified by the first optical amplifier 21. The reception circuit 27 receives information from the super-channel optically divided by the optical divider 22, the information being information to be transmitted through a designated SC. The WSS 23 adjusts signal power for each SC in the super-channel optically divided by the optical divider 22. The transmission circuit 28 adds the to-be-transmitted information to the SC in the super-channel. The optical inserter 24 optically inserts the information from the transmission circuit 28 into a free SC in the super-channel received from the WSS 23. The second optical amplifier 25 performs optical amplification on the super-channel received from the optical inserter 24.

Figure 6A:
FIGS. 6A and 6B are each an explanatory diagram illustrating an example of a setting table.
Figure 6B:

The communication section 30 is a communication interface for communicating with the control device 2. The OCM 29 monitors signal power of each SC of the super-channel in an output stage of the node N. The OCM control circuit 31 controls the OCM 29. The WSS control circuit 32 controls the WSS 23. The setting table 33 is used to store an adjustment amount currently set for each SC in the WSS 23. FIGS. 6A and 6B are each an explanatory diagram illustrating an example of the setting table 33. A setting table 33A illustrated in FIG. 6A is used to manage adjustment amounts acquired from the control device 2 for SC1 to SC4 that are control targets, for example, adjustment amounts of −0.8 dB for SC1 and SC4 and 0 dB for SC2 and SC3. The setting table 33A illustrates an example of a case where free slots on the long and short wavelength sides have the same free slot amount. A setting table 33B illustrated in FIG. 6B is used to manage adjustment amounts for SC1 to SC5 that are control targets, for example, adjustment amounts of −2.0 dB for SC1, −1.5 dB for SC2, 0 dB for SC3, −0.3 dB for SC4, and −0.6 dB for SC5. The setting table 33B illustrates a case where free slots on the respective long and short wavelength sides have different free slot amounts.

Figure 7:
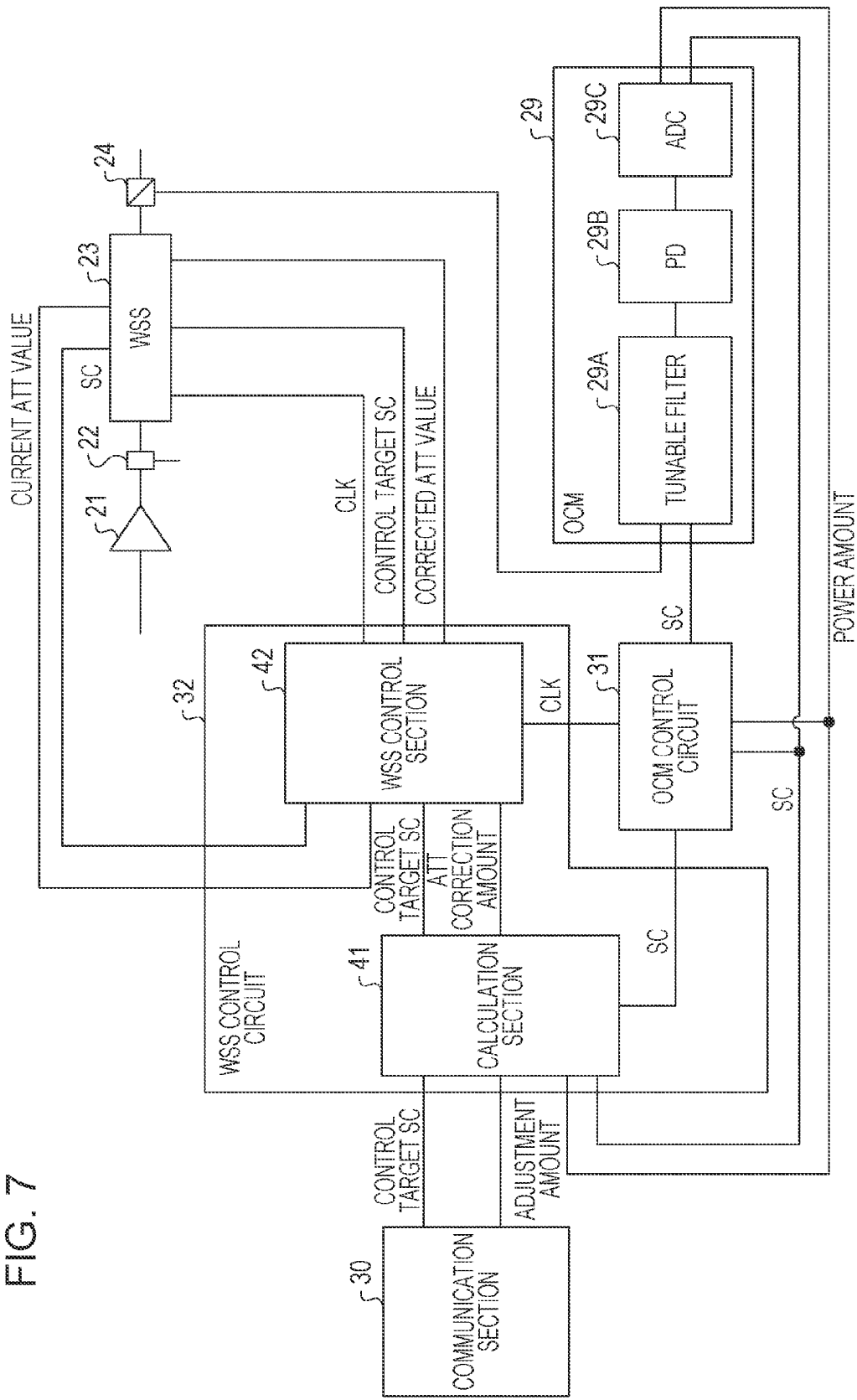
FIG. 7 is an explanatory diagram illustrating an example of a functional configuration of circuits of each node.

FIG. 7 is an explanatory diagram illustrating an example of a functional configuration of circuits of the node N. The OCM 29 illustrated in FIG. 7 includes a tunable filter 29A, a photo diode (PD) 29B, and an analog-digital converter (ADC) 29C. The tunable filter 29A is used to tune a reception wavelength by sweeping wavelengths in a predetermined bandwidth. The PD 29B electrically transduces optical power received at the reception wavelength. The ADC 29C converts the electrically transduced optical power signal into a corresponding digital power-amount signal. The OCM control circuit 31 controls the wavelength sweeping performed by the tunable filter 29A.

The WSS control circuit 32 includes a calculation section 41 and a WSS control section 42. In a case where each control-target-SC-specific adjustment amount is acquired from the control device 2 through the communication section 30, the calculation section 41 calculates an attenuation (ATT) correction amount for the control-target-SC-specific adjustment amount (also referred to as a control-target-SC-specific ATT correction amount) and sets, in the WSS control section 42, the calculated control-target-SC-specific ATT correction amount. The WSS control section 42 controls adjustment performed by the WSS 23. The WSS control section 42 calculates a corrected ATT value from a difference between the control-target-SC-specific ATT correction amount and a current ATT value for the control target SC and sets the corrected ATT value calculated for the control target SC (also referred to as a control-target-SC-specific corrected ATT value) in the WSS 23. The WSS 23 adjusts an attenuation amount of the signal power for the control target SC by using the control-target-SC-specific corrected ATT value. Further, the calculation section 41 acquires an amount of the signal power for the control target SC as a result of measurement performed by the OCM 29 and monitors whether the acquired power amount for the control target SC matches the setting. Note that a process of judging whether the power amount matches the setting is a process of judging whether the control-target-SC-specific adjustment amount acquired from the control device 2 is the same as actual signal power.

Figure 8A:
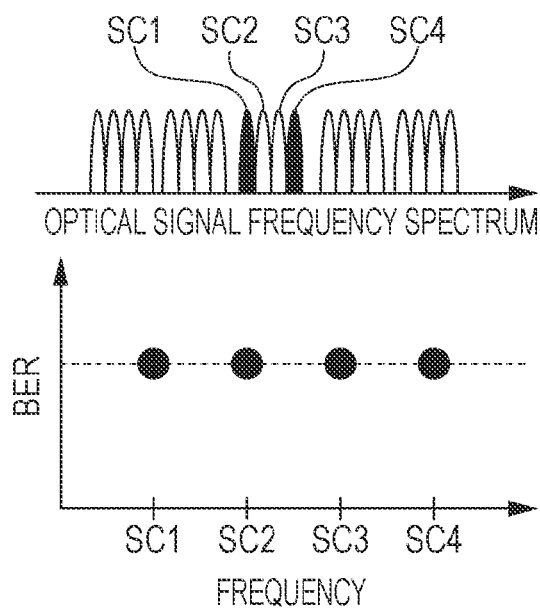
FIGS. 8A and 8B are each an explanatory diagram illustrating an example of a relationship between each of SC1 to SC4 in a control target super-channel and a bit error rate (BER)
Figure 8B:
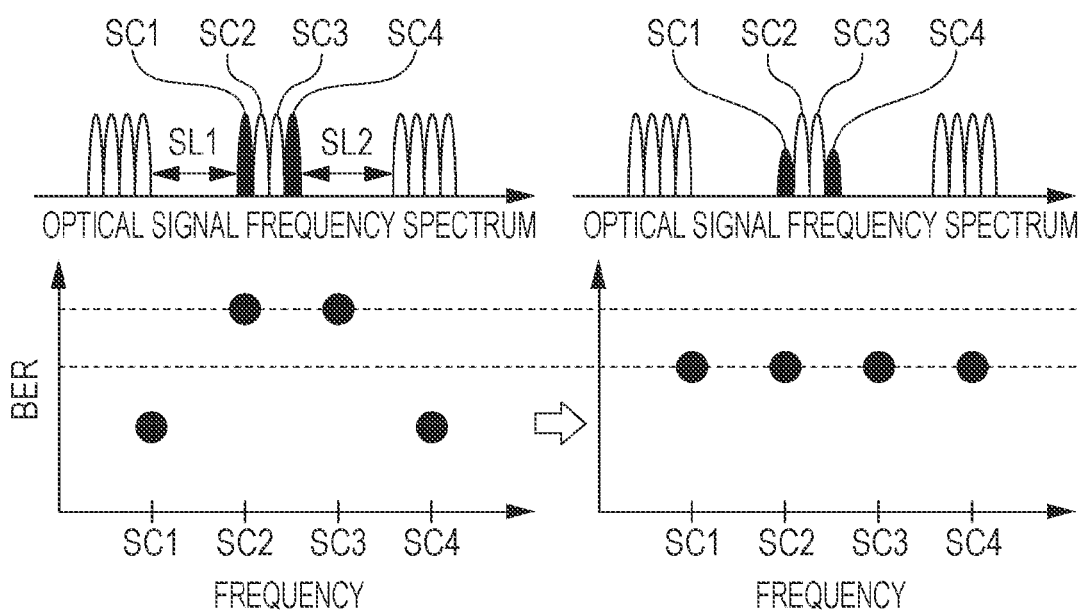

FIGS. 8A and 8B are each an explanatory diagram illustrating an example of a relationship between each of SC1 to SC4 in a control target super-channel and a BER. Since the end SCs on the respective short and long wavelength sides of the control target super-channel illustrated in FIG. 8A are contiguous to other super-channels, there is no free slot. Since SC1 to SC4 in the control target super-channel are contiguous to one another in an optical signal frequency spectrum, there is no BER difference among the SCs in the control target super-channel. Accordingly, the transmission characteristics are also stable in the entire the control target super-channel.

A free slot SL1 exists between SC1 on the short wavelength side of the control target super-channel illustrated in FIG. 8B and another super-channel, and a free slot SL2 exists between SC4 on the long wavelength side of the control target super-channel and another super-channel. The BERs of SC2 and SC3 in the control target super-channel are increased due to the presence of the free slots, being influenced by nonlinear noise, of SC1 and SC4, caused by cross-phase modulation.

Upon detecting a free slot of the node N, the control device 2 selects a correspondence table 14 provided in accordance with the number of SCs in the super-channel of the control target node N related to the free slot. The control device 2 further acquires, from the selected correspondence table 14, control-target-SC-specific adjustment amounts provided for a free slot amount (62.5 GHz). The control device 2 notifies the control target node N of the control-target-SC-specific adjustment amounts. Then, the control target node N acquires each control-target-SC-specific adjustment amount from the control device 2 and adjusts an attenuation amount for the SC (also referred to as a control-target-SC-specific attenuation amount) in the WSS 23 based on the adjustment amount. The adjustment of the attenuation amount in the WSS 23 in accordance with the control-target-SC-specific adjustment amount consequently causes the node N to have no BER difference among the SCs and thus has stable transmission characteristics in the entire control target super-channel.

Figure 9:
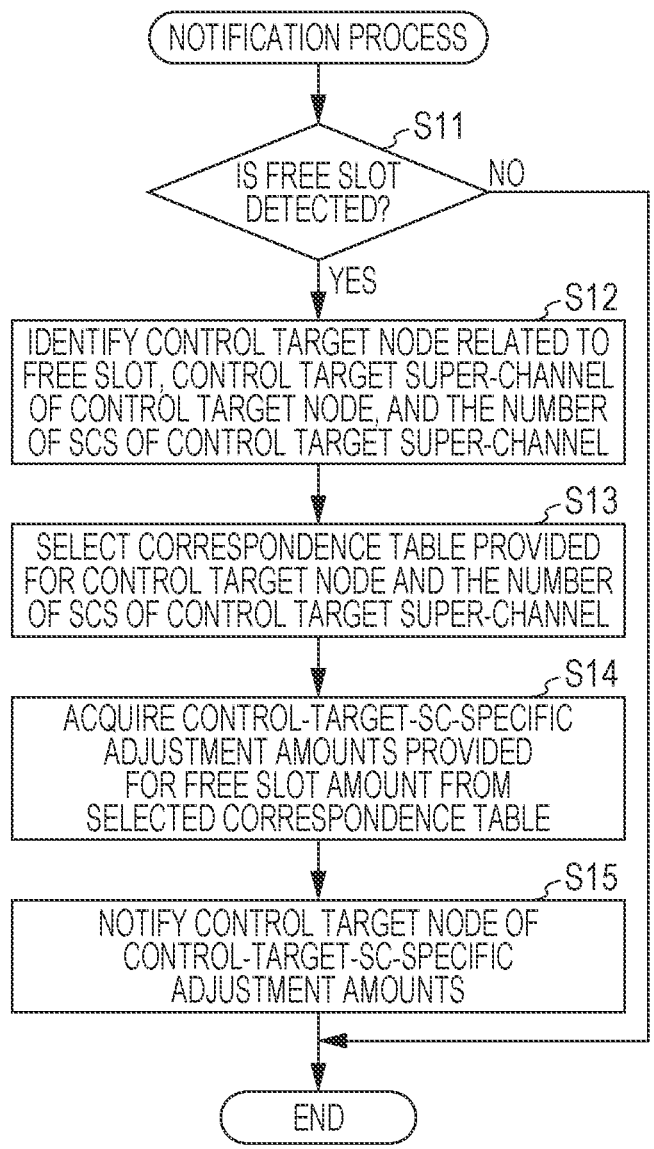
FIG. 9 is a flowchart illustrating an example of how the control device operates in relation to a notification process.

Operation of the optical transmission system 1 in Embodiment 1 will next be described. FIG. 9 is a flowchart illustrating an example of how the control device 2 operates in relation to a notification process. In the notification process illustrated in FIG. 9, upon detecting a free slot, the control device 2 notifies a control target node N of control-target-SC-specific adjustment amounts provided for a free slot amount.

In FIG. 9, the control section 12 of the control device 2 refers to the management table 13 to judge whether a free slot is detected in the optical transmission system 1 (step S11). Note that the control section 12 monitors a use state of each channel transmitted through the corresponding optical transmission line 3 in the optical transmission system 1 and updates the corresponding management table 13 by using the monitoring result.

If a free slot is detected (affirmative in step S11), the control section 12 identifies a control target node N related to the free slot, a control target super-channel of the control target node N, and the number of SCs of the super-channel (step S12). The control section 12 selects a correspondence table 14 provided for the control target node N in accordance with the number of SCs in the control target super-channel (step S13).

The control section 12 acquires, from the selected correspondence table 14, control-target-SC-specific adjustment amounts provided for a free slot amount (step S14). The control section 12 notifies the control target node N of the control-target-SC-specific adjustment amounts (step S15) and terminates the process operation illustrated in FIG. 9. If a free slot is not detected (negative in step S11), the control section 12 terminates the process operation illustrated in FIG. 9.

In the notification process illustrated in FIG. 9, upon detecting a free slot, the control device 2 acquires, from the correspondence table 14 provided for the control target node N related to the free slot in accordance with the number of SCs of the super-channel, the control-target-SC-specific adjustment amounts provided for a free slot amount. In a case where the control device 2 acquires the control-target-SC-specific adjustment amounts, the control device 2 may notify the control target node N of the control-target-SC-specific adjustment amounts.

Figure 10:
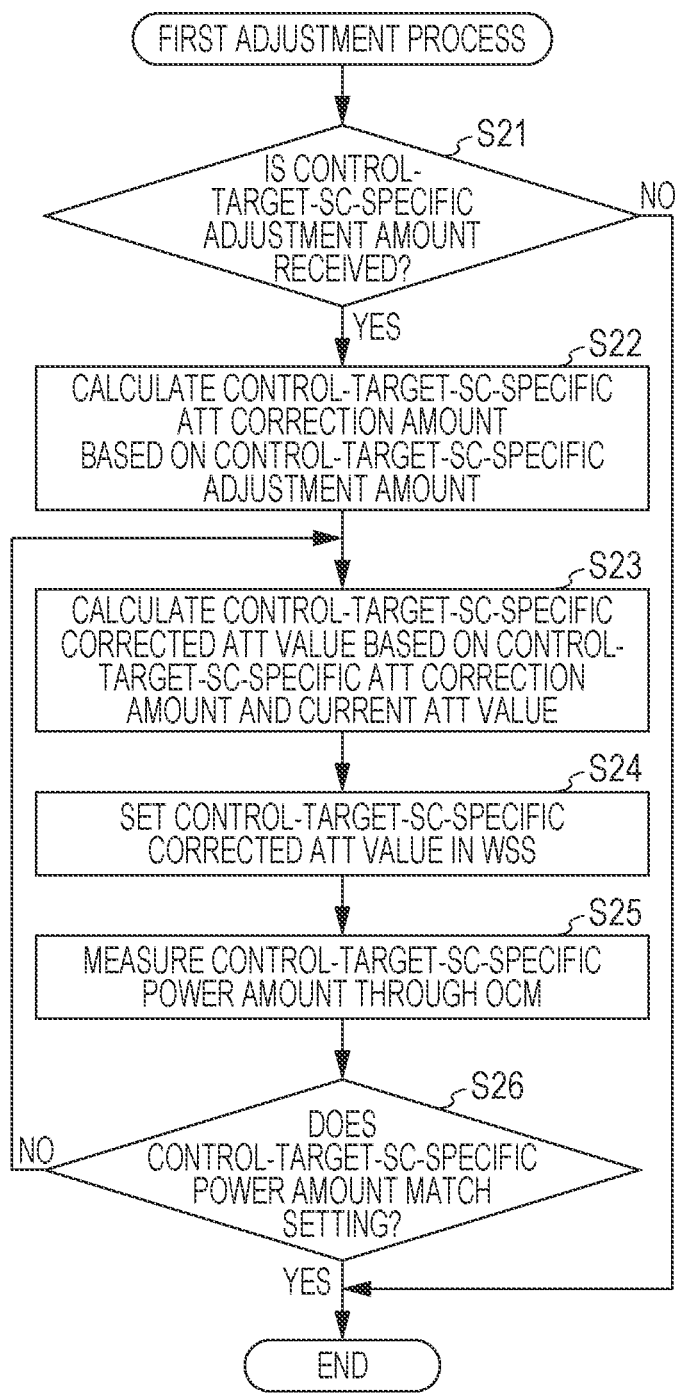
FIG. 10 is a flowchart illustrating an example of how the node operates in relation to a first adjustment process.

FIG. 10 is a flowchart illustrating an example of how the node N operates in relation to a first adjustment process. In the first adjustment process illustrated in FIG. 10, control-target-SC-specific attenuation amounts in the WSS 23 are adjusted based on the control-target-SC-specific adjustment amounts acquired from the control device 2.

In FIG. 10, the calculation section 41 in the WSS control circuit 32 in the node N judges whether each control-target-SC-specific adjustment amount is received from the control device 2 through the communication section 30 (step S21). If the control-target-SC-specific adjustment amount is received (affirmative in step S21), the calculation section 41 calculates a control-target-SC-specific ATT correction amount based on the control-target-SC-specific adjustment amount (step S22).

The WSS control section 42 of the WSS control circuit 32 calculates a control-target-SC-specific corrected ATT value from a difference between the calculated control-target-SC-specific ATT correction amount and a current control-target-SC-specific ATT value (step S23). The WSS control section 42 sets the control-target-SC-specific corrected ATT value in the WSS 23 (step S24). As a result, the WSS 23 adjusts a control-target-SC-specific attenuation amount based on the control-target-SC-specific corrected ATT value.

The calculation section 41 acquires an amount of the current signal power for each control target SC (also referred to as a current control-target-SC-specific power amount) through the OCM 29 (step S25) and judges whether the current control-target-SC-specific power amount matches the set control-target-SC-specific adjustment amount (step S26). If the current control-target-SC-specific power amount matches the set control-target-SC-specific adjustment amount (affirmative in step S26), the calculation section 41 terminates the process operation illustrated in FIG. 10.

If the current control-target-SC-specific power amount does not match the set control-target-SC-specific adjustment amount (negative in step S26), the calculation section 41 moves to step S23 to have setting in accordance with the control-target-SC-specific adjustment amount acquired from the control device 2. If the control-target-SC-specific adjustment amount is not received (negative in step S21), the calculation section 41 terminates the process operation illustrated in FIG. 10.

If the node N that executes the first adjustment process illustrated in FIG. 10 receives the control-target-SC-specific adjustment amount, the node N sets the corrected ATT value based on the control-target-SC-specific adjustment amount in the WSS 23. This results in adjustment of the signal power attenuation amount for each control target SC to have no transmission performance difference among the control target SCs in the control target super-channel. Since there is no signal power difference among the SCs in the control target super-channel, the transmission characteristics of the entire super-channel are stabilized, and thus a propagation distance is increased.

In Embodiment 1, if a free slot contiguous to the control target super-channel is detected, the node N acquires each control-target-SC-specific adjustment amount in the control target super-channel provided for a free slot amount and sets a corrected ATT value based on the corresponding control-target-SC-specific adjustment amount in the WSS 23. The WSS 23 attenuates the signal power for each control target SC based on the control-target-SC-specific adjustment amount. This results in no transmission performance difference among the SCs in the control target super-channel, thus enabling reduction in deterioration of the transmission performance characteristics in the entire control target super-channel. This also enables the signal quality to be enhanced and a propagation distance to be increased.

In a case where free slots on the respective short and long wavelength sides of the control target super-channel have the same free slot amount, the control device 2 notifies the control target node N of each control-target-SC-specific adjustment amount provided for the free slot amount. The control target node N sets, in the WSS 23, a corrected ATT value based on the corresponding control-target-SC-specific adjustment amount acquired from the control device 2. The WSS 23 attenuates the signal power for each control target SC based on the control-target-SC-specific corrected ATT value. This results in no transmission performance difference among the SCs in the control target super-channel, thus enabling reduction in deterioration of the transmission performance characteristics in the entire control target super-channel.

In the case where free slots on the respective short and long wavelength sides of the control target super-channel have different free slot amounts, the control device 2 acquires control-target-SC-specific adjustment amounts provided for the free slot amount on the short wavelength side and further acquires control-target-SC-specific adjustment amounts provided for the free slot amount on the long wavelength side. The control device 2 notifies the control target node N of each control-target-SC-specific adjustment amount provided for the corresponding free slot amount on the long or short wavelength side. The control target node N sets, in the WSS 23, a corrected ATT value based on the corresponding control-target-SC-specific adjustment amount acquired from the control device 2. The WSS 23 attenuates the signal power for each control target SC based on the control-target-SC-specific corrected ATT value. Also in the case of different free slot amounts on the respective long and short wavelength sides of the control target super-channel, this results in no transmission performance difference among the SCs in the control target super-channel, thus enabling reduction in deterioration of the transmission performance characteristics in the entire control target super-channel.

In Embodiment 1, the corrected ATT value based on the corresponding control-target-SC-specific adjustment amount is set in the WSS 23 in accordance with an amount of a free slot between the control target super-channel and another channel group. As a result, transmission characteristics deterioration of the entire control target super-channel may be reduced without measuring BERs.

In the description above in Embodiment 1, in the case where a free slot between the control target super-channel and another super-channel adjacent to the control target super-channel is detected, control-target-SC-specific adjustment amounts provided for a free slot amount are acquired from the correspondence table 14. The adjacent channel is not limited to the other super-channel and may be a channel group based on a different modulation system.

Figures 11A, 11B:
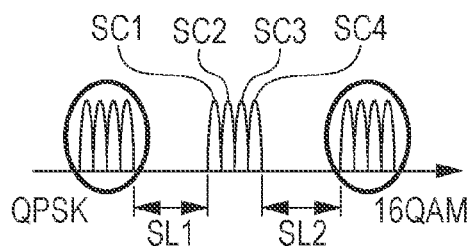

FIGS. 11A, 11B, and 11C are each an explanatory diagram illustrating an example of adjustment amounts set in consideration of a channel group based on a different modulation system. A channel group based on quadrature phase shift keying (QPSK) exists next to SC1 on the short wavelength side of a control target super-channel illustrated in FIG. 11A, and a free slot SL1 exists between the QPSK channel group and SC1. Further, a channel group based on quadrature amplitude modulation (16QAM) exists next to SC4 on the long wavelength side of the control target super-channel, and a free slot SL2 exists between the 16QAM channel group and SC4.

Since control-target-SC-specific adjustment amounts provided for a corresponding free slot amount related to the control target super-channel varies with the modulation system used for the adjacent channel, the correspondence table 14 is prepared for each modulation system.

FIG. 11B illustrates an example of a correspondence table 14C used in a case where a QPSK channel group is adjacent to a control target super-channel (five SCs). In this case, a free slot amount of 137.5 GHz is assigned an adjustment amount of −2.0 dB for SC1 and SC5, an adjustment amount of −1.5 dB for SC2 and SC4, and an adjustment amount of 0 dB for SC3.

In contrast, FIG. 11C illustrates an example of a correspondence table 14D used in a case where a 16QAM channel group is adjacent to a control target super-channel (five SCs). In this case, a free slot amount of 137.5 GHz is assigned an adjustment amount of −1.8 dB for SC1 and SC5, an adjustment amount of −1.3 dB for SC2 and SC4, and an adjustment amount of 0 dB for SC3.

A higher multilevel degree of an adjacent channel group causes a larger influence of cross-phase modulation on end SCs of a control target super-channel, and thus smaller transmission performance differences among SCs of the control target super-channel. This leads to small adjustment amounts.

When detecting a free slot between SC1 on the short wavelength side of the control target super-channel and the QPSK channel group, the control device 2 selects the correspondence table 14C illustrated in FIG. 11B. The control device 2 acquires adjustment amounts for SC1, SC2, and SC3 as control target SCs on the short wavelength side from the correspondence table 14C. Specifically, the control device 2 acquires adjustment amounts of −2.0 dB, −1.5 dB, and 0 dB for SC1, SC2, and SC3, respectively.

When detecting a free slot between SC4 on the long wavelength side of the control target super-channel and the 16QAM channel group, the control device 2 selects the correspondence table 14D illustrated in FIG. 11C. The control device 2 acquires adjustment amounts for SC3, SC4, and SC5 as the control target SCs on the long wavelength side from the correspondence table 14D. Specifically, the control device 2 acquires adjustment amounts of −1.8 dB, −1.3 dB, and 0 dB for SC5, SC4, and SC3, respectively.

Then, the control device 2 notifies the control target node N of the adjustment amounts of −2.0 dB, −1.5 dB, 0 dB, −1.3 dB, and −1.8 dB for SC1, SC2, SC3, SC4, and SC5, respectively.

The control device 2 acquires the control-target-SC-specific adjustment amounts provided for the free slot amounts provided in accordance with the control target super-channel and the modulation systems of the adjacent channel groups and notifies the control target node N of control-target-SC-specific adjustment amounts. The control target node N adjusts control-target-SC-specific attenuation amounts in the WSS 23 based on the control-target-SC-specific adjustment amounts. Also in the case where the channel groups adjacent to the control target super-channel on the long and short wavelength sides are based on different modulation systems, and where free slots each exist in between, this results in no transmission performance difference among the SCs in the control target super-channel. Moreover, deterioration of the transmission performance characteristics in the entire control target super-channel may be reduced.

In the description above in Embodiment 1, control-target-SC-specific adjustment amounts are adjusted based on the free slot amount set for an adjacent channel. However, the control device 2 also varies adjustment amounts in accordance with the number of spans from a transmitting end node N(Tx) to a control target node N(m), the transmitting end node N(Tx) transmitting a control target super-channel. Hence, a correspondence table 14 is prepared in which control-target-SC-specific adjustment amounts provided for each free slot amount are managed based on the number of spans. FIGS. 12A, 12B, 12C, and 12D are each an explanatory diagram illustrating an example of adjustment amounts set in consideration of the number of spans. Note that each span has the same span length.

FIG. 12A illustrates a case where the number of spans is "2". In this case, the control target node N(m) receives a control target super-channel in a span SP1 from the transmitting end node N(Tx) and transmits the super-channel in a span SP2. It may be said that a small number of spans lead to a short propagation distance from the transmitting end node N(Tx) to the control target node N(m), thus leading to a large influence of nonlinear noise in the spans and thus large adjustment amounts.

The control device 2 has a prepared correspondence table 14E illustrated in FIG. 12B for the number of spans "2" of the control target node N(m). For example, in a case where a free slot amount is 12.5 GHz, an adjustment amount of 0 dB for SC2 and SC3 and an adjustment amount of −0.5 dB for SC1 and SC4 are managed in the correspondence table 14E for the number of spans "2".

FIG. 12C illustrates a case where the number of spans is "7". In this case, the control target node N(m) receives a control target super-channel in a span SP6 from the transmitting end node N(Tx) and transmits the super-channel in a span SP7. A large number of spans lead to a long propagation distance from the transmitting end node N(Tx)

to the control target node N(m), thus leading to a small influence of nonlinear noise in the spans and thus small adjustment amounts.

The control device 2 has a prepared correspondence table 14F illustrated in FIG. 12D for the number of spans "7" of the control target node N(m). For example, in the case where a free slot amount is 12.5 GHz, an adjustment amount of 0 dB for SC2 and SC3 and an adjustment amount of −0.3 dB for SC1 and SC4 are managed in the correspondence table 14F for the number of spans "7".

A small number of spans lead to a short propagation distance from the transmitting end node N(Tx) to the control target node N(m), thus leading to a large influence of the nonlinear noise and thus large adjustment amounts. It may be said that a large number of spans lead to a long propagation distance from the transmitting end node N(Tx) to the control target node N(m), thus leading to a small influence of the nonlinear noise in the spans and thus small adjustment amounts.

Note that each span has the same span length in the description above, but the span length is not limited to the same span length. In addition, as the adjustment amounts also vary depending on the propagation distance of the control target super-channel from the transmitting end node N(Tx) to the control target node N(m), a correspondence table for managing control-target-SC-specific adjustment amounts may be prepared for each propagation distance, instead of the number of spans.

The case where free slots exist on the respective long and short wavelength sides of the control target super-channel has been described for the control device 2. Suppose a case where a free slot exists on one of the long and short wavelength sides, for example, on the short wavelength side, where the number of SCs in the control target super-channel is, for example, 5 (SC1 to SC5), and where a free slot amount is 25 GHz. The control device 2 controls SC1 to SC3 as the control target SCs and acquires, from the correspondence table 14B, adjustment amounts of −1.0 dB, −0.5 dB, and 0 dB for SC1, SC2, and SC3, respectively (see FIG. 4B). Then, the control device 2 notifies the control target node N of the control-target-SC-specific adjustment amounts (for SC1 to SC3). Also in the case where a free slot exists on one of the long and short wavelength sides of the control target super-channel, this results in no transmission performance difference among the SCs in the control target super-channel. Moreover, transmission characteristics deterioration in the entire control target super-channel may be reduced.

In a case where the node N in the description above in Embodiment 1 acquires control-target-SC-specific adjustment amounts in the control target super-channel provided for a free slot amount from the control device 2, the node N adjusts control-target-SC-specific attenuation amounts in the WSS 23 based on the control-target-SC-specific adjustment amounts. However, in a case where channel addition or the like after the attenuation amount adjustment causes an attenuation amount to be lower than 0 dB, amplification of the attenuation amount by an optical amplifier is desired. Hence, an embodiment to respond to such a situation will be described below as Embodiment 2.

Embodiment 2

Figure 14:
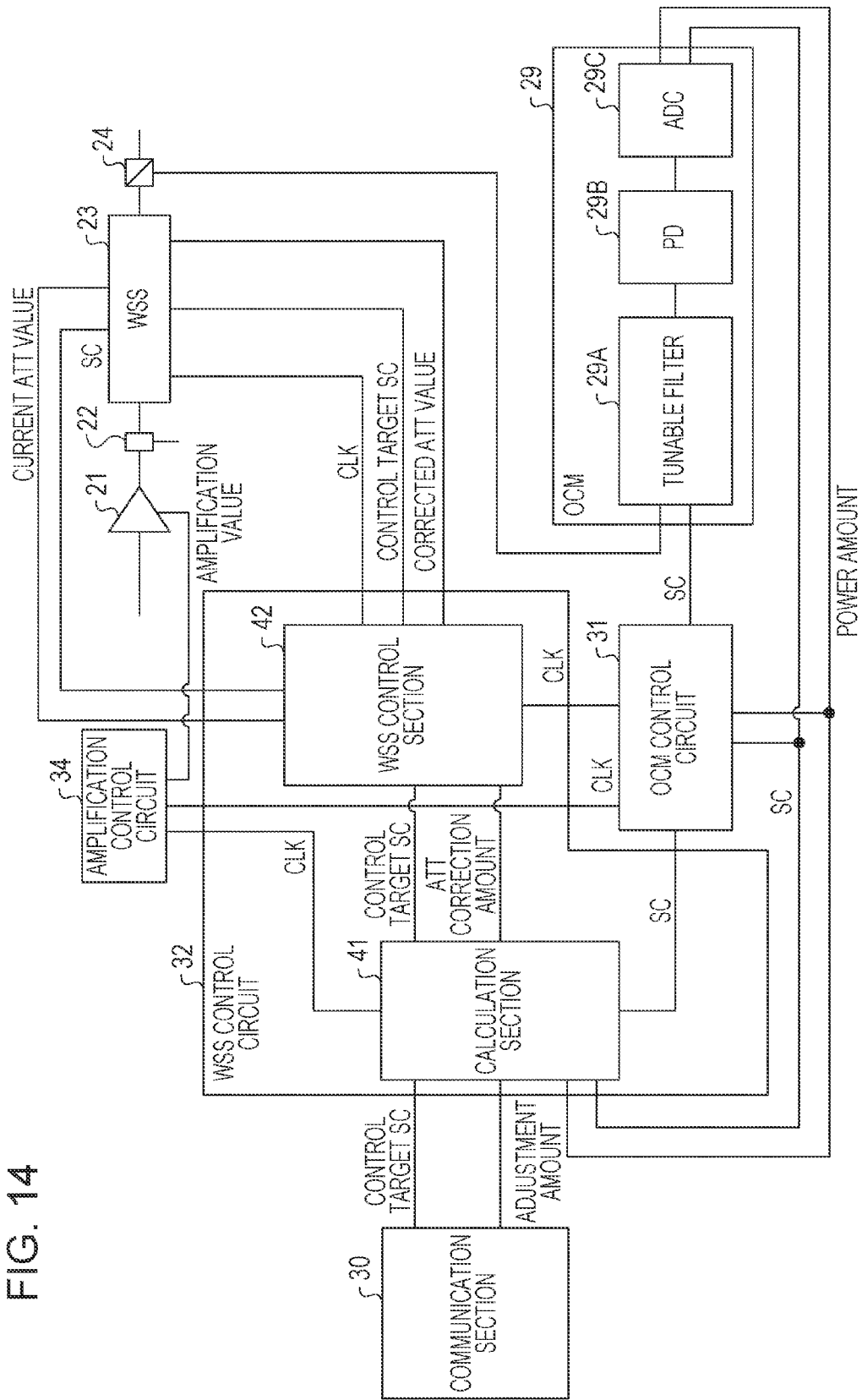
FIG. 14 is an explanatory diagram illustrating an example of a functional configuration of circuits of each of nodes.

FIG. 13 is a block diagram illustrating an example of an optical transmission system 1B in Embodiment 2. FIG. 14 is an explanatory diagram illustrating an example of a functional configuration of circuits of a node NA. The same components as those of the optical transmission system 1 in Embodiment 1 are denoted by the same reference numerals, and thereby repeated description of the configuration and operation of the components are omitted.

A difference between the node NA in the optical transmission system 1B illustrated in FIG. 13 and the node N illustrated in FIG. 2 lies in that the node NA includes an amplification control circuit 34 for controlling the first optical amplifier 21 or the second optical amplifier 25. In FIG. 13, free slots on the short and long wavelength sides of a control target super-channel of the node NA exist in an input stage through the optical transmission line 3. The node NA acquires each control-target-SC-specific adjustment amount from the control device 2 and adjusts an attenuation amount for the corresponding control target SC to be used in the WSS 23 based on the control-target-SC-specific adjustment amount.

Suppose a case where the node NA adjusts the attenuation amount based on the control-target-SC-specific adjustment amount, thereafter additionally sets channel groups in free slots on the short and long wavelength sides, respectively, of the control target super-channel, and thus is not influenced any more by nonlinear noise caused by the free slots. In other words, suppose a case where the attenuation amount for the node NA desired to set in the WSS 23 is lower than 0 dB and where signal power amplification is thus desired.

In the case where other channel groups are additionally set in the free slots after the attenuation amount is adjusted in the WSS 23 based on the control-target-SC-specific adjustment amount, the calculation section 41 of the WSS control circuit 32 illustrated in FIG. 14 judges whether an attenuation amount desired to be set in the WSS 23 is lower than 0 dB. In other words, the calculation section 41 judges whether a corrected ATT value is lower than 0 dB. If the corrected ATT value is lower than 0 dB, the calculation section 41 does not attenuate signal power any more, and thus the amplification control circuit 34 is activated. The amplification control circuit 34 causes the first optical amplifier 21 to amplify the control target super-channel in predetermined units. The calculation section 41 acquires an amount of signal power of each SC in the control target super-channel from the OCM 29. The calculation section 41 calculates an ATT correction amount for the corresponding control-target-SC-specific adjustment amount after the amplification and sets the calculated control-target-SC-specific ATT correction amount in the WSS control section 42. The WSS control section 42 calculates a corrected ATT value by using a difference between the control-target-SC-specific ATT correction amount and the current ATT value for the control target SC and again sets the control-target-SC-specific corrected ATT value in the WSS 23. The WSS 23 again adjusts the attenuation amount for the signal power of the control target SC by using the control-target-SC-specific corrected ATT value.

Figure 15:
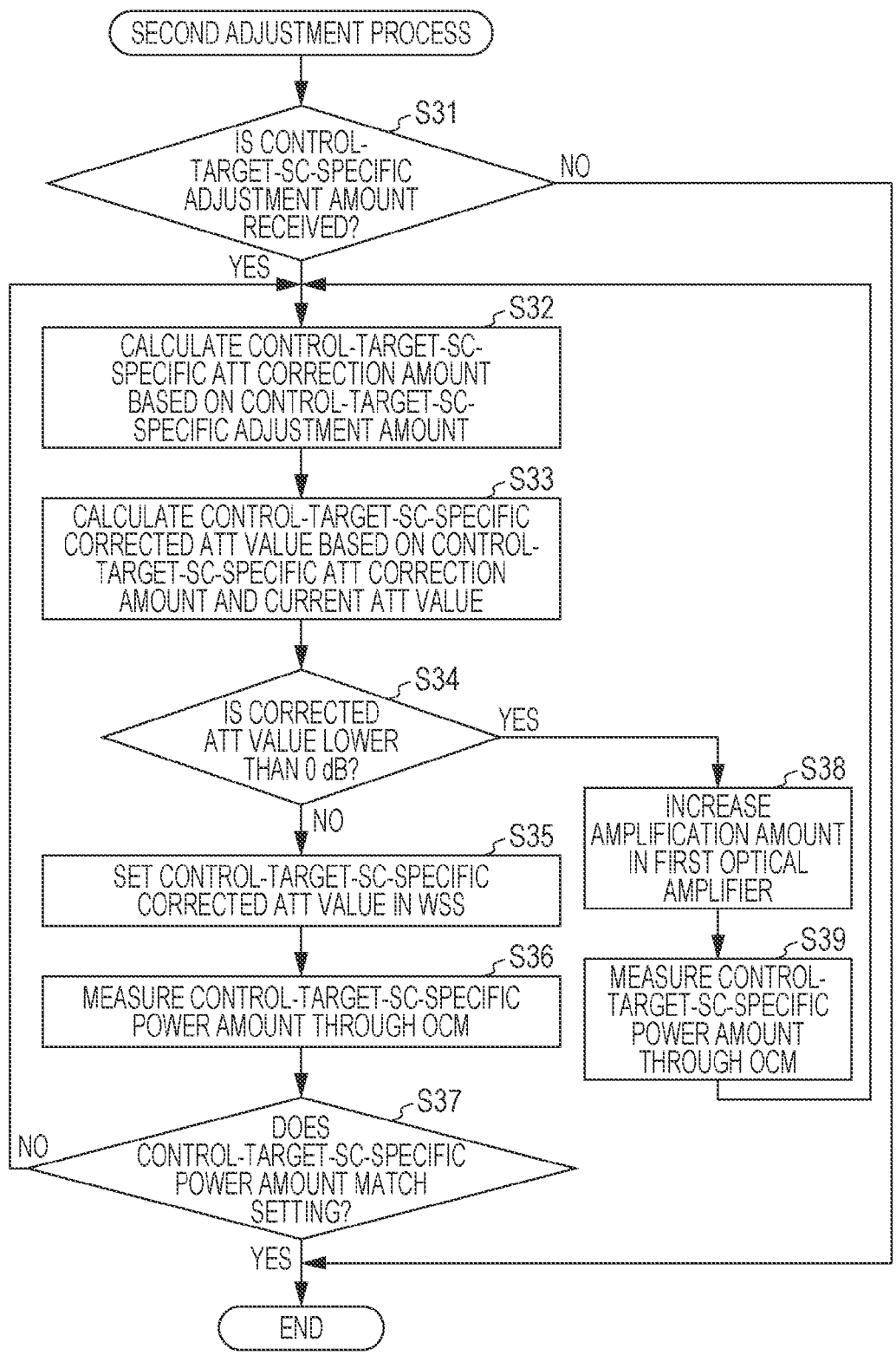
FIG. 15 is a flowchart illustrating an example of how the node operates in relation to a second adjustment process.

FIG. 15 is a flowchart illustrating an example of how the node NA operates in relation to a second adjustment process. The second adjustment process illustrated in FIG. 15 is performed in the following manner. If a corrected ATT value is lower than 0 dB, the super-channel is amplified by the first optical amplifier 21. Thereafter, a control-target-SC-specific attenuation amount in the WSS 23 is again adjusted based on the control-target-SC-specific adjustment amount.

In FIG. 15, the calculation section 41 of the WSS control circuit 32 in the node NA judges whether each control-target-SC-specific adjustment amount is received from the control device 2 through the communication section 30 (step S31). If the control-target-SC-specific adjustment amount is received (affirmative in step S31), the calculation section 41 calculates a control-target-SC-specific ATT correction amount based on the control-target-SC-specific adjustment amount (step S32).

The WSS control section 42 in the WSS control circuit 32 calculates a control-target-SC-specific corrected ATT value from a difference between the calculated control-target-SC-specific ATT correction amount and a current control-target-SC-specific ATT value (step S33).

The calculation section 41 judges whether the corrected ATT value is lower than 0 dB (step S34). If the corrected ATT value is not lower than 0 dB (negative in step S34), it is determined that attenuation may be performed in the WSS 23, and the WSS control section 42 sets the control-target-SC-specific corrected ATT value in the WSS 23 (step S35). As a result, the WSS 23 adjusts a control-target-SC-specific signal power attenuation amount based on the control-target-SC-specific corrected ATT value.

The calculation section 41 measures a current control-target-SC-specific power amount through the OCM 29 (step S36) and judges whether the current control-target-SC-specific power amount matches the set control-target-SC-specific adjustment amount (step S37). If the current control-target-SC-specific power amount matches the set control-target-SC-specific adjustment amount (affirmative in step S37), the calculation section 41 terminates the process operation illustrated in FIG. 15. If the current control-target-SC-specific power amount does not match the set control-target-SC-specific adjustment amount (negative in step S37), the calculation section 41 moves to step S32 to have setting in accordance with the control-target-SC-specific adjustment amount acquired from the control device 2.

If the corrected ATT value is lower than 0 dB (affirmative in step S34), it is determined that the attenuation is not allowed in the WSS 23, and the amplification control circuit 34 increases an amount of amplification to be performed by the first optical amplifier 21 by a predetermined amount (step S38). After the amplification amount is increased by the predetermined amount, the calculation section 41 measures the current control-target-SC-specific power amount through the OCM 29 (step S39) and moves to step S32 to again calculate the control-target-SC-specific ATT correction amount based on the control-target-SC-specific adjustment amount. If the control-target-SC-specific adjustment amount is not received (negative in step S31), the calculation section 41 terminates the process operation illustrated in FIG. 15.

The second adjustment process illustrated in FIG. 15 is performed in the following manner. If the corrected ATT value is lower than 0 dB, the control target super-channel is amplified by the predetermined amount by the first optical amplifier 21, and thereafter the corrected ATT value based on the control-target-SC-specific adjustment amount acquired from the control device 2 is again set in the WSS 23. Also in a case where a free slot amount varies after the adjustment based on the adjustment amount due to, for example, channel addition, this enables adjustment of the attenuation amount and thus results in no transmission performance difference among the SCs in the control target super-channel. Moreover, transmission characteristics deterioration in the entire control target super-channel may be reduced.

In Embodiment 2, if the corrected ATT value is lower than 0 dB, the control target super-channel is amplified by the predetermined amount by the first optical amplifier 21, and thereafter the corrected ATT value based on the control-target-SC-specific adjustment amount acquired from the control device 2 is again set in the WSS 23. Also in a case where a free slot amount varies after the adjustment based on the adjustment amount due to, for example, channel addition, this enables adjustment of the attenuation amount and thus results in no transmission performance difference among the SCs in the control target super-channel. Moreover, deterioration of the transmission performance characteristics in the entire control target super-channel may be reduced.

If the corrected ATT value is lower than 0 dB in the amplification control circuit 34 in the description above in Embodiment 2, the control target super-channel is amplified by the first optical amplifier 21 but may be amplified by the second optical amplifier 25.

In Embodiment 1 described above, the control device 2 judges whether a free slot exists between the control target super-channel and an adjacent channel. However, each node N (NA) may judge whether the free slot exists. An embodiment in this case will be described below as Embodiment 3.

Embodiment 3

Figure 16:
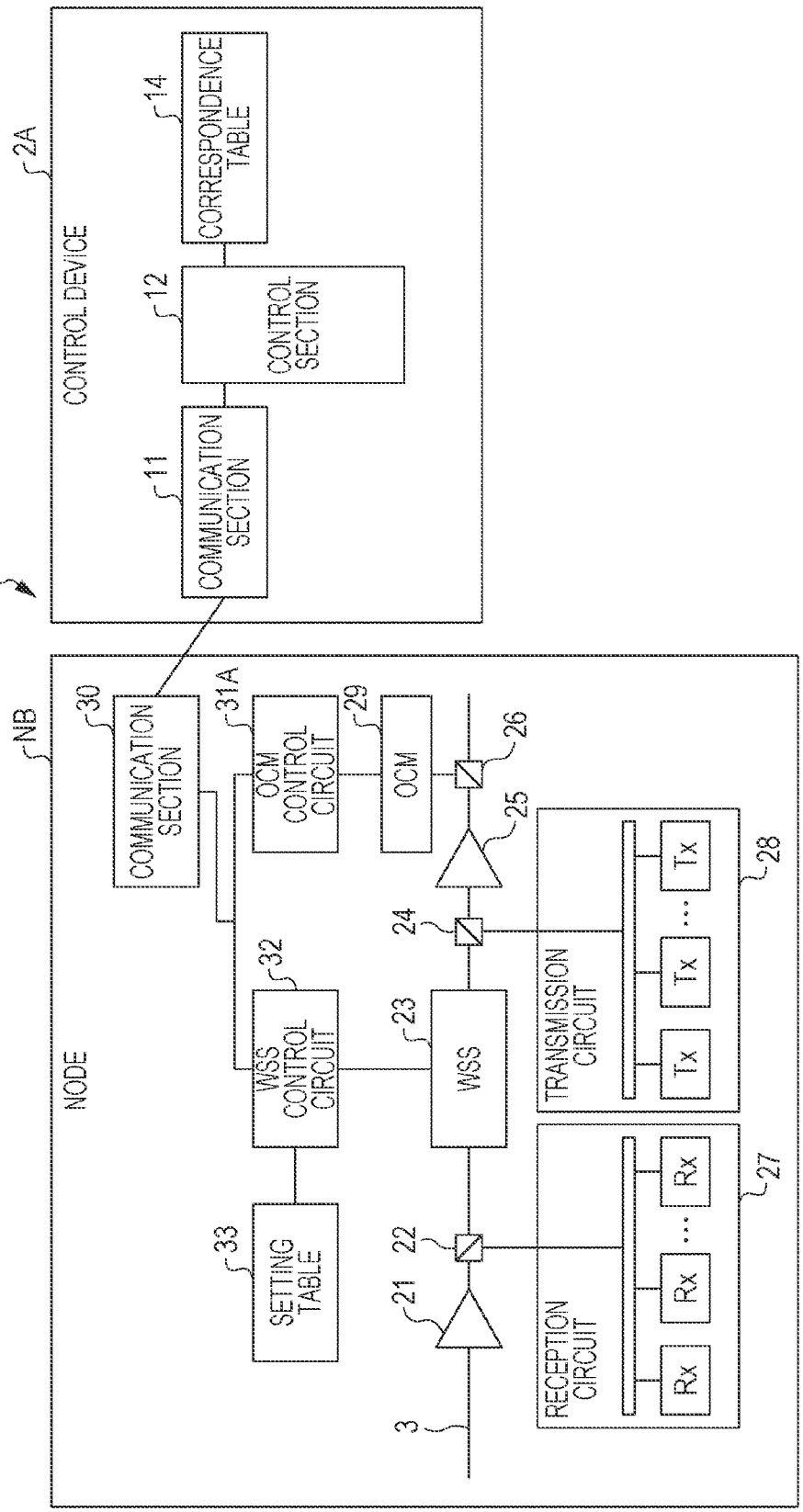
FIG. 16 is a block diagram illustrating an example of an optical transmission system in Embodiment 3.
Figure 17:
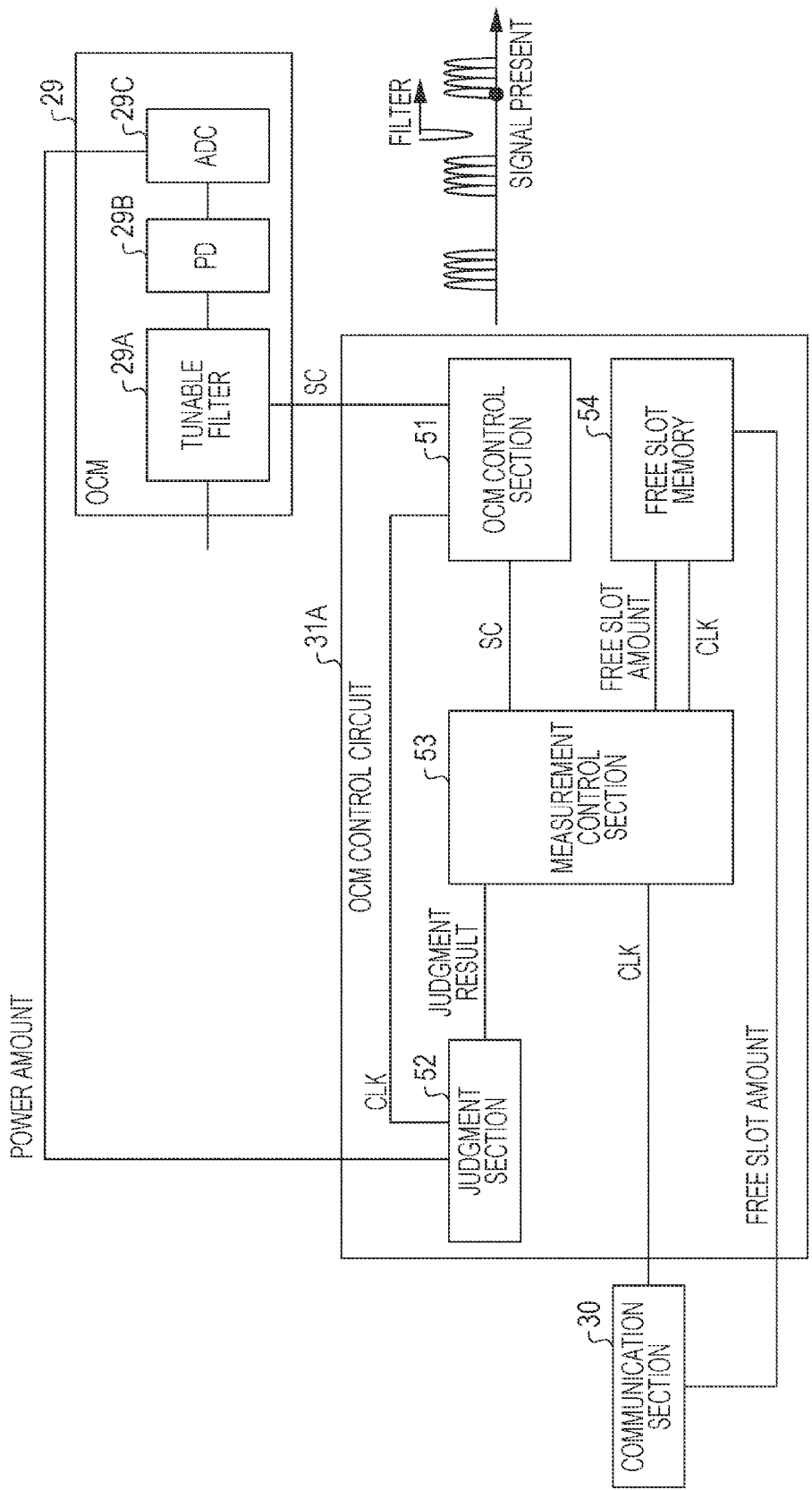
FIG. 17 is an explanatory diagram illustrating an example of functional configurations of an optical channel monitor (OCM) control circuit and an OCM.

FIG. 16 is an explanatory diagram illustrating an example of an optical transmission system 1C in Embodiment 3. FIG. 17 is an explanatory diagram illustrating an example of functional configurations of an OCM control circuit 31A and the OCM 29. The same components as those of the optical transmission system 1 in Embodiment 1 are denoted by the same reference numerals, and thereby repeated description of the configuration and operation of the components are omitted.

A difference between a node NB in the optical transmission system 1B illustrated in FIG. 16 and the node N illustrated in FIG. 2 lies in that the OCM control circuit 31A has a function of judging whether a free slot exists between a control target super-channel and an adjacent channel group. In addition, a control device 2A does not include the management table 13 and acquires a free slot amount from the node NB.

The OCM control circuit 31A illustrated in FIG. 17 includes an OCM control section 51, a judgment section 52, a measurement control section 53, and a free slot memory 54. The OCM control section 51 controls wavelength sweeping performed by the tunable filter 29A of the OCM 29. In conjunction with the wavelength sweeping performed on the short and wavelength sides of a control target super-channel, the judgment section 52 measures an amount of signal power for each wavelength through the OCM 29. The judgment section 52 acquires the wavelength-based power amount from the OCM 29 and judges the presence of a signal for each wavelength based on a result of judgement of whether the wavelength-based power amount exceeds a predetermined threshold.

Upon detecting a measurement request from the control device 2A through the communication section 30, the measurement control section 53 causes the OCM control section 51 to start the wavelength sweeping. The measurement control section 53 judges whether a free slot exists on the short or long wavelength side of the control target channel based on a result of the judgment performed by the judgment section 52. The measurement control section 53 starts a wavelength sweeping operation on the short wavelength side and identifies a wavelength corresponding to the time of detecting a signal from an adjacent channel group on the short wavelength side. Based on the wavelength at which the signal of the channel group on the short wavelength side is detected and the wavelength of a SC on the short wavelength side at which the wavelength sweeping operation is started, the measurement control section 53 calculates a free slot amount on the short wavelength side and stores the calculated free slot amount in the free slot memory 54.

The measurement control section 53 starts the wavelength sweeping operation on the long wavelength side and identifies a wavelength corresponding to the time of detecting a signal from an adjacent channel group on the long wavelength side. Based on the wavelength at which the signal of the channel group on the long wavelength side is detected and the wavelength of a SC on the long wavelength side at which the wavelength sweeping operation is started, the measurement control section 53 calculates a free slot amount on the long wavelength side and stores the calculated free slot amount in the free slot memory 54.

After a free slot on the short or long wavelength side is detected, the OCM control circuit 31A notifies the control device 2A of an amount of the free slot. The control device 2A identifies a control target node NB, a control target super-channel, and the number of SCs of the control target super-channel according to the free slot amount calculated in response to the measurement request. Further, the control device 2A selects a correspondence table 14 provided for the number of SCs of the control target super-channel and the control target node NB that are thus identified. Further, the control device 2A acquires, from the selected correspondence table 14, control-target-SC-specific adjustment amounts provided for the free slot amount and notifies the control target node NB of the acquired control-target-SC-specific adjustment amounts.

Figure 18:
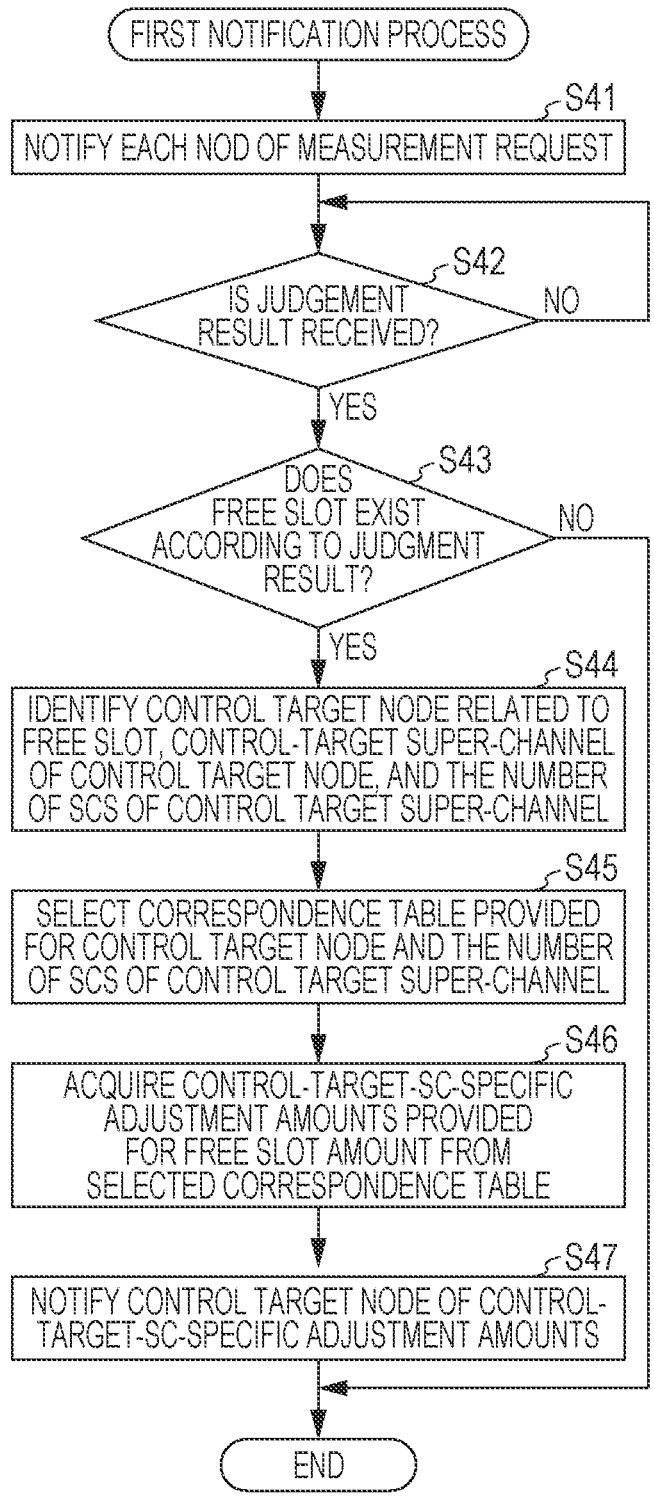
FIG. 18 is a flowchart illustrating an example of how a control device operates in relation to a first notification process.

Operation of the optical transmission system 1C in Embodiment 3 will next be described. FIG. 18 is a flowchart illustrating an example of how the control device 2A operates in relation to a first notification process. In the first notification process illustrated in FIG. 18, the control device 2A acquires control-target-SC-specific adjustment amounts in a control target super-channel that are provided for a free slot amount acquired from each node NB, and the acquired control-target-SC-specific adjustment amounts are notified to a control target node NB.

In FIG. 18, the control section 12 of the control device 2A transmits a measurement request to each node NB in the optical transmission system 1C (step S41). The control section 12 judges whether a result of a judgment performed in response to the measurement request is received (step S42). Note that a judgment result includes the presence or absence of a free slot, a free slot amount, and the like. If the judgment result is received (affirmative in step S42), the control section 12 judges whether a free slot exists based on the judgment result (step S43).

If a free slot exists (affirmative in step S43), the control section 12 identifies a control target node NB related to the free slot, a control target super-channel, and the number of SCs of the control target super-channel (step S44). The control section 12 selects a correspondence table 14 for the control target node NB and the number of SCs in the control target super-channel (step S45).

The control section 12 acquires control-target-SC-specific adjustment amounts provided for the free slot amount, from the selected correspondence table 14 (step S46). The control section 12 notifies the control target node NB of the acquired control-target-SC-specific adjustment amounts through the communication section 30 (step S47) and terminates the process operation illustrated in FIG. 18.

If a result of a judgment performed in response to the measurement request is not received (negative in step S42), the control section 12 returns to step S42 to monitor whether the judgment result is received. If a free slot is not detected (negative in step S43), the control section 12 terminates the process operation illustrated in FIG. 18.

If the control device 2A that executes the first notification process illustrated in FIG. 18 receives the presence of a free slot and a free slot amount acquired from each node NB, the control device 2A acquires, from the correspondence table 14, control-target-SC-specific adjustment amounts in the control target super-channel provided for the free slot amount. The control device 2A may notify the control target node NB of the acquired control-target-SC-specific adjustment amounts.

Figure 19A:
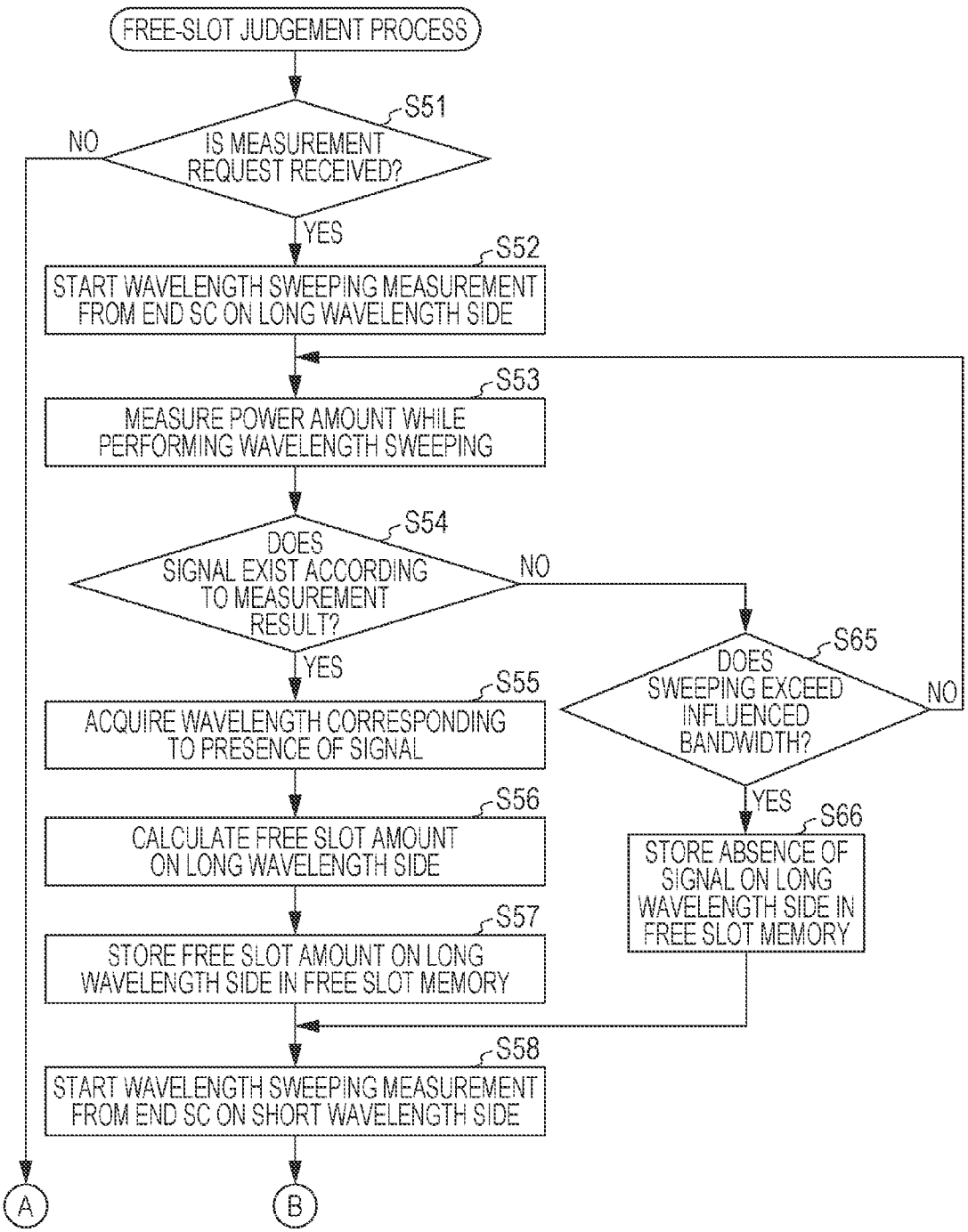
FIGS. 19A and 19B are flowcharts illustrating an example of how a node operates in relation to a free-slot judgment process.
Figure 19B:
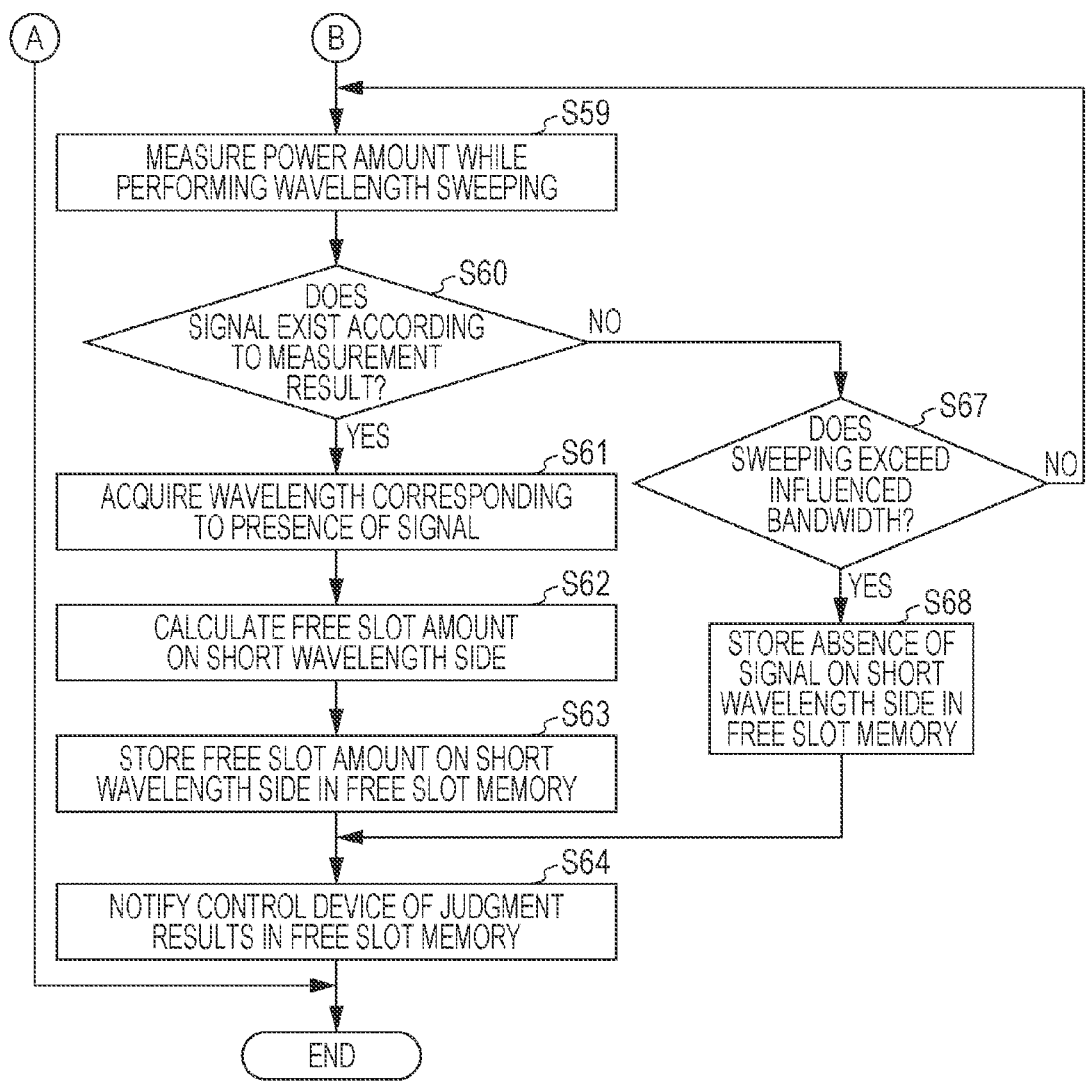

FIGS. 19A and 19B are flowcharts illustrating an example of how each node NB operates in relation to a free-slot judgment process. In the free-slot judgment process illustrated in FIGS. 19A and 19B, whether a free slot exists between a control target super-channel and an adjacent channel group is judged in response to the measurement request from the control device 2A, and a judgment result is notified to the control device 2A.

In FIGS. 19A and 19B, the measurement control section 53 of the OCM control circuit 31A in the node NB judges whether the measurement request is received from the control device 2A through the communication section 30 (step S51). If the measurement request is received (affirmative in step S51), the measurement control section 53 starts wavelength sweeping measurement from the end SC on the long wavelength side of the control target super-channel (step S52). The OCM control section 51 measures a signal power amount through the OCM 29, while wavelength sweeping is being performed from the end SC on the long wavelength side in a long wavelength direction (step S53).

The judgment section 52 of the OCM control circuit 31A judges whether a signal exists based on a result of the power amount measurement performed through the OCM 29 (step S54). If a signal exists (affirmative in step S54), the measurement control section 53 determines the signal as a channel group adjacent to the control target super-channel and acquires a wavelength corresponding to the presence of the signal (step S55). The measurement control section 53 further calculates a free slot amount on the long wavelength side from the wavelength corresponding to the presence of the signal and a wavelength of the end SC at the start of the wavelength sweeping (step S56) and stores the free slot amount on the long wavelength side in the free slot memory 54 (step S57).

The measurement control section 53 starts the wavelength sweeping measurement from the end SC on the short wavelength side of the control target super-channel (step S58). The OCM control section 51 measures a signal power amount through the OCM 29, while wavelength sweeping is being performed from the end SC on the short wavelength side in a short wavelength direction (step S59).

The judgment section 52 judges whether a signal exists based on a result of the power amount measurement performed through the OCM 29 (step S60). If a signal exists (affirmative in step S60), the measurement control section 53 determines the signal as a channel group adjacent to the control target super-channel and acquires a wavelength corresponding to the presence of the signal (step S61). The measurement control section 53 further calculates a free slot amount on the short wavelength side from the wavelength corresponding to the presence of the signal and the wavelength of the end SC at the start of the wavelength sweeping (step S62) and stores the free slot amount on the short wavelength side in the free slot memory 54 (step S63).

The measurement control section 53 notifies the control device 2A of each judgment result stored in the free slot memory 54 through the communication section 30 (step S64) and terminates the process operation illustrated in FIGS. 19A and 19B.

If a signal does not exist according to the measurement result (negative in step S54), the measurement control section 53 judges whether the wavelength sweeping in the long wavelength direction exceeds the influenced wavelength band (step S65). Note that the influenced wavelength band in step S65 is a wavelength on the long wavelength side that is to be influenced by nonlinear noise caused by cross-phase modulation. If the wavelength sweeping in the long wavelength direction exceeds the influenced wavelength band (affirmative in step S65), the measurement control section 53 determines that a free slot on the long wavelength side is absent, stores the absence of a free slot on the long wavelength side in the free slot memory 54 (step S66), and moves to step S58. If the wavelength sweeping in the long wavelength direction does not exceed the influenced wavelength band (negative in step S65), the measurement control section 53 moves to step S53 to continue the wavelength sweeping in the long wavelength direction.

If a signal is absent according to the measurement result (negative in step S60), the measurement control section 53 judges whether the wavelength sweeping in the short wavelength exceeds the influenced wavelength band (step S67). Note that the influenced wavelength band in step S67 is a wavelength on the short wavelength side that is to be influenced by nonlinear noise caused by cross-phase modulation. If the wavelength sweeping in the short wavelength exceeds the influenced wavelength band (affirmative in step S67), the measurement control section 53 determines that a free slot on the short wavelength side is absent, stores the absence of the free slot on the short wavelength side in the free slot memory 54 (step S68), and moves to step S64. If the wavelength sweeping in the short wavelength does not exceed the influenced wavelength band (negative in step S67), the measurement control section 53 moves to step S59 to continue the wavelength sweeping in the short wavelength direction.

If the node NB that executes the free-slot judgment process illustrated in FIGS. 19A and 19B receives a measurement request from the control device 2A, the node NB causes the tunable filter 29A to perform wavelength sweeping and judges whether a signal exists on the long wavelength side of the control target super-channel. Then, the node NB calculates a free slot amount on the long wavelength side based on the wavelength judged as the presence of a signal on the long wavelength side. As a result, the node NB may acquire the free slot amount of the control target super-channel on the long wavelength side.

The node NB also calculates a free slot amount on the short wavelength side based on the wavelength judged as the presence of a signal on the short wavelength side. As a result, the node NB may acquire the free slot amount of the control target super-channel on the short wavelength side.

The control device 2A in Embodiment 3 acquires the amount of a free slot contiguous to the control target super-channel from each node NB, acquires control-target-SC-specific adjustment amounts provided for the acquired free slot amount from the correspondence table 14, and notifies a control target node NB of the acquired control-target-SC-specific adjustment amounts. As a result, the control device 2A causes each node NB to take charge of a process of acquiring a free slot amount and thus may reduce processing load. Also in the case where a free slot exists on one of the long and short wavelength sides of the control target super-channel, this results in no transmission performance difference among the SCs in the control target super-channel. Moreover, transmission characteristics deterioration in the entire control target super-channel may be reduced.

In the embodiments described above, control-target-SC-specific adjustment amounts in a control target super-channel are set in the following manner. Specifically, an adjustment amount for the center SC is set at 0 dB as a reference adjustment amount. The adjustment amount is increased in a signal-power attenuation direction as a target SC is moved closer to the end SCs from the center SC. However, for example, the adjustment amounts may also be set in the following manner. Adjustment amounts for the end SCs are set at 0 dB as a reference adjustment amount. The adjustment amount is increased in a signal-power amplification direction as a target SC is moved closer to the center SC from the end SCs. An embodiment in this case will be described below as Embodiment 4.

Embodiment 4

Figure 20:
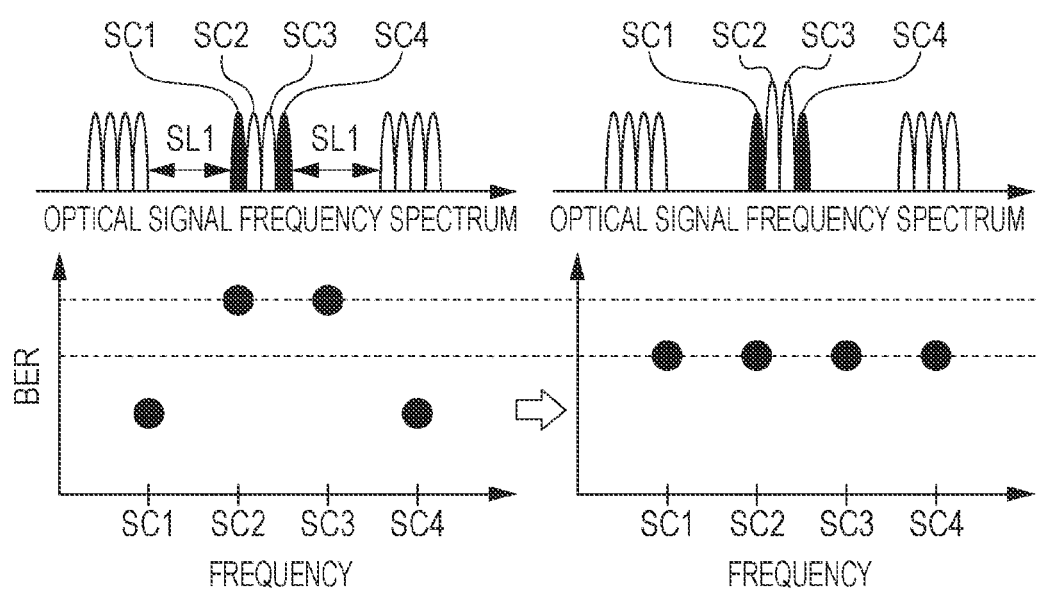
FIG. 20 is an explanatory diagram illustrating an example of a relationship between each of SC1 to SC4 in a control target super-channel and a BER.

FIG. 20 is an explanatory diagram illustrating an example of a relationship between each of SC1 to SC4 in a control target super-channel and a BER. FIGS. 21A and 21B are each an explanatory diagram illustrating an example of the correspondence table 14. The same components as those of the optical transmission system 1B in Embodiment 2 are denoted by the same reference numerals, and thereby repeated description of the configuration and operation of the components are omitted.

Suppose a case where a super-channel including, for example, four SCs from SC1 to SC4 are to be controlled and where a free slot amount is, for example, 25 GHz. In this case, the control device 2 prepares a correspondence table 14X. In the correspondence table 14X, adjustment amounts for SC1 and SC4 on the ends are set at 0 dB, and adjustment amounts for SC3 and SC4 in the center are set at +0.5 dB, as illustrated in FIG. 21A. In other words, in a case where the number of SCs is an even number of 4 or higher, an adjustment amount for each of the two end SCs is set at 0 dB, and the adjustment amount is increased in a signal-power amplification direction as a target SC is moved closer to the center SCs from the end SCs, as illustrated in FIG. 21A.

For example, suppose a case where a super-channel including five SC from SC1 to SC5 are to be controlled and where a free slot amount is 25 GHz. In this case, the control device 2 prepares a correspondence table 14Y. In the correspondence table 14Y, adjustment amounts for SC1 and SC5 on the ends are set at 0 dB, adjustment amounts for SC2 and SC4 next to SC1 and SC5, respectively, are set at +0.5 dB, and an adjustment amount for the center SC3 is set at +1.0 dB, as illustrated in FIG. 21B. In other words, in a case where the number of SCs is an odd number, an adjustment amount for each of the two end SCs is set at 0 dB, and the adjustment amount is increased in a signal-power amplification direction as a target SC is moved closer to the center SC from the end SCs.

Upon detecting a free slot for a node N in the optical transmission system 1B, the control device 2 selects a correspondence table 14 of the node N provided in accordance with the number of SCs of a super-channel that is contiguous to the free slot and is transmitted by the node N. The control device 2 further acquires, from the selected correspondence table 14, control-target-SC-specific adjustment amounts provided for a free slot amount. For example, suppose a case where the control target super-channel has four SCs and where a free slot amount on the short wavelength side and a free slot amount on the long wavelength side are the same amount of 25 GHz. In this case, the control device 2 acquires an adjustment amount of 0 dB for SC1 and SC4 and an adjustment amount of +0.5 dB for SC2 and SC3 from the correspondence table 14X. The control device 2 further notifies the control target node N of the acquired control target SCs and the acquired control-target-SC-specific adjustment amounts. Then, the control target node N acquires the control-target-SC-specific adjustment amounts from the control device 2. Based on the adjustment amounts, the control target node N adjusts amplification amounts for respective SCs (also referred to as control-target-SC-specific amplification amounts) to be used in the first optical amplifier 21. In the node N, the adjustment of the amplification amounts performed by the first optical amplifier 21 in accordance with the control-target-SC-specific adjustment amounts results in no BER difference among the SCs and thus stable transmission characteristics in the entire control target super-channel, as illustrated in FIG. 20. Note that the node N may adjust control-target-SC-specific attenuation amounts in the WSS 23 in accordance with the control-target-SC-specific adjustment amounts.

In Embodiment 4, upon detecting a free slot contiguous to a control target super-channel, control-target-SC-specific adjustment amounts for the control target super-channel provided for a free slot amount are acquired, and amplification amounts based on the control-target-SC-specific adjustment amounts are set in the first optical amplifier 21. The first optical amplifier 21 amplifies signal power for each control target SC based on the corresponding control-target-SC-specific amplification amount. In other words, the first optical amplifier 21 uses the signal power of the end SC on the free slot side as reference signal power to amplify the signal power from the end SC in such a manner that the amplified signal power is increased as a target SC is moved closer to the center SC from the end SC. This results in no transmission performance difference among the SCs in the control target super-channel, thus enabling reduction in deterioration of transmission performance characteristics in the entire control target super-channel. This also enables the signal quality to be enhanced and a propagation distance to be increased.

In the case where free slots on the short and long wavelength sides of the control target super-channel have the same free slot amount, the control device 2 notifies the control target node N of the control-target-SC-specific adjustment amounts provided for the free slot amount. The control target node N sets, in the first optical amplifier 21, amplification amounts based on the control-target-SC-specific adjustment amounts acquired from the control device 2. The first optical amplifier 21 amplifies signal power for each control target SC based on the corresponding control-target-SC-specific amplification amount. This results in no transmission performance difference among the SCs in the control target super-channel, thus enabling reduction in deterioration of the transmission performance characteristics in the entire control target super-channel.

In the case where free slots on the respective short and long wavelength sides of the control target super-channel have different free slot amounts, the control device 2 acquires control-target-SC-specific adjustment amounts provided for the free slot amount on the short wavelength side and further acquires control-target-SC-specific adjustment amounts provided for the free slot amount on the long wavelength side. The control device 2 notifies the control target node N of the control-target-SC-specific adjustment amounts provided for the free slot amounts on the long and short wavelength sides. The control target node N sets, in the first optical amplifier 21, amplification amounts based on the control-target-SC-specific adjustment amounts acquired from the control device 2. The first optical amplifier 21 amplifies signal power for each control target SC based on the corresponding control-target-SC-specific amplification amount. Also in the case of different free slot amounts on the respective long and short wavelength sides of the control target super-channel, this results in no transmission performance difference among the SCs in the control target super-channel, thus enabling reduction in deterioration of the transmission performance characteristics in the entire control target super-channel.

The embodiments described above use a super-channel as an example of a control target but are applicable to a plurality of wavelength signals contiguous to one another and transmitted to the same destination also in a WDM system, for example.

In the embodiments described above, the correspondence table 14 is held in the control device 2, and control-target-SC-specific adjustment amounts provided for a free slot amount are acquired. However, the correspondence table 14 may be held in the node N (or NA or NB), instead of in the control device 2. In this case, the node N acquires the control-target-SC-specific adjustment amounts without communicating with the control device 2, in accordance with the free slot amount from the correspondence table managed by the node N. The node N then sets corrected ATT values based on the adjustment amounts in the WSS 23. In this case, the processing load on the control device 2 in acquiring and notifying the control-target-SC-specific adjustment amounts may be reduced in accordance with the free slot amount.

A free slot amount is a free frequency bandwidth between the control target super-channel and a channel adjacent to the control target super-channel but may be a bandwidth obtained by subtracting a signal bandwidth from a channel interval between the control target super-channel and the adjacent channel.

Each component of the sections illustrated in the drawings does not necessarily have to have the illustrated physical configuration. In other words, a specific mode of dispersing or integrating the sections is not limited to the illustrated mode. Any unit may be used to functionally or physically disperse or integrate all or some of the sections in accordance with any of the various types of load, use states, and the like.

Although the various processing functions are implemented by the devices, all or some of the functions may be implemented by a central processing unit (CPU) (or a microcomputer such as a micro processing unit (MPU) or a micro controller unit (MCU)). It goes without saying that all or any of the processing functions may be run by using a program executed for parsing by the CPU (or the microcomputer such as a MPU or a MCU) or by using hardware based on wired logic.

As described above, the applicant proposes that the transmission characteristics in the entire super-channel be improved in the following a manner. Specifically, signal power of SCs at both ends are lowered relative to the other SCs to reduce the influence on the center SC due to nonlinear noise, and thereby the transmission performances of the SCs are equalized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission system, comprising:
   a processor configured to acquire a free slot amount that is a free frequency bandwidth between a target channel including a plurality of wavelength signals contiguous to one another and a channel adjacent to the target channel; and
   a wavelength selective switch configured to adjust signal power of at least one of the plurality of wavelength signals in the target channel, an amount of adjustment of the at least one wavelength signal corresponding to an optimum output level of signal power for the at least one wavelength signal and being based on the free slot amount acquired by the processor.

2. The transmission system according to claim 1, wherein based on the amount of adjustment, the wavelength selective switch adjusts the signal power of the wavelength signal that is contiguous to the free frequency bandwidth.

3. The transmission system according to claim 1, wherein based on the amount of adjustment, the wavelength selective switch adjusts the signal power of the one of the plurality of wavelength signals contiguous to one another that is centered in the target channel.

4. The transmission system according to claim 1,
   wherein the target channel is a super-channel including a plurality of sub-carriers that are wavelength signals,
   wherein the processor acquires the free slot amount that is the free frequency bandwidth between the super-channel and a channel adjacent to the super-channel, and
   wherein the wavelength selective switch adjusts signal power of at least one of the sub-carriers in the super-channel based on the free slot amount.

5. The transmission system according to claim 1, wherein destinations of the wavelength signals are identical.

6. The transmission system according to claim 1, wherein the channel adjacent to the target channel is a channel using a transmission method that is identical to a transmission method used for the target channel.

7. The transmission system according to claim 1, wherein the amount of adjustment is an amount provided for a width of the free slot, the number of spans from a transmission device that transmits the target channel to a control target transmission device, or a propagation distance from the transmission device that transmits the target channel to the control target transmission device.

8. The transmission system according to claim 1, wherein the channel adjacent to the target channel is a channel using a transmission method that is different from a transmission method used for the target channel.

9. A transmission method for a transmission system to execute a process comprising:
   acquiring a free slot amount that is a free frequency bandwidth between a target channel including a plurality of wavelength signals contiguous to one another and a channel adjacent to the target channel; and
   adjusting signal power of at least one of the plurality of wavelength signals in the target channel, an amount of adjustment of the at least one wavelength signal corresponding to an optimum output level of signal power for the at least one wavelength signal and being based on the acquired free slot amount.

* * * * *